US007778516B2

(12) United States Patent
David et al.

(10) Patent No.: US 7,778,516 B2
(45) Date of Patent: Aug. 17, 2010

(54) IDENTIFYING, RECORDING AND REPRODUCING INFORMATION

(75) Inventors: Morgan William Amos David, Farnham (GB); James Hedley Wilkinson, Tadley (GB); Andrew Collins, Basingstoke (GB); Martin Rex Dorricot, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1657 days.

(21) Appl. No.: 10/016,828

(22) Filed: Dec. 4, 2001

(65) Prior Publication Data

US 2002/0131764 A1 Sep. 19, 2002

Related U.S. Application Data

(63) Continuation of application No. PCT/GB01/01458, filed on Mar. 30, 2001.

(30) Foreign Application Priority Data

| Apr. 5, 2000 | (GB) | ................................ 0008398.0 |
| Apr. 5, 2000 | (GB) | ................................ 0008426.9 |
| Apr. 5, 2000 | (GB) | ................................ 0008436.8 |

(51) Int. Cl.
*H04N 5/76* (2006.01)
*H04N 7/00* (2006.01)

(52) U.S. Cl. .......................................... 386/46; 386/95
(58) Field of Classification Search ................... 386/46, 386/94, 95, 83, 52, 125; 725/60
See application file for complete search history.

(56) References Cited

U.S. PATENT DOCUMENTS 4,466,029 A 8/1984 Tanaka (Continued)

FOREIGN PATENT DOCUMENTS

EP 0 279 885 2/1987

(Continued)

OTHER PUBLICATIONS

Wilkinson J. H. : "Linking Essence and Metadata in a Systems Environment" IEE NBSS 6th Jul. 1999.*

(Continued)

*Primary Examiner*—Thai Tran
*Assistant Examiner*—Gelek Topgyal
(74) *Attorney, Agent, or Firm*—Oblon, Spivak, McClelland, Maier & Neustadt, L.L.P.

(57) ABSTRACT

A signal processing system comprises a recorder (500,204) for recording information signals representing video audio and/or data material on a tape (502, 126). The recorder (500, 204) generates (152,178) first material identifiers for identifying respective pieces of material on the medium such that each piece is differentiated from other pieces on the medium, and generates second, universally unique, identifiers for pieces of material, the second identifiers being associated with the first identifiers.

The recorder (468, 472, 470 FIG. 31) records the material on successive slant tracks. A slant track stores a video timecode. At least one linear track stores a linear track timecode. The timecodes each have a plurality of user-definable bits. The material identifiers (464) are stored in the user-definable bits of the slant track timecode and in the user-definable bits of the linear track timecode. The identifiers associate the material with metadata objects. The metadata objects are repeatedly recorded (FIG. 33, 2)on the tape. The metadata objects are recorded a number of times corresponding to the relative importance of the metadata objects. [FIGS. 1, 31 and 33]

17 Claims, 32 Drawing Sheets

U.S. PATENT DOCUMENTS

| | | | |
|---|---|---|---|
| 5,910,825 A | 6/1999 | Takeuchi | |
| 6,038,368 A | 3/2000 | Boetje et al. | |
| 6,240,241 B1 * | 5/2001 | Yuen | 386/95 |
| 6,408,301 B1 * | 6/2002 | Patton et al. | 707/102 |
| 2005/0188409 A1 * | 8/2005 | Daniels | 725/88 |

FOREIGN PATENT DOCUMENTS

| | | |
|---|---|---|
| EP | 1 083 568 | 3/2001 |
| EP | 1 102 271 | 5/2001 |
| EP | 1 102 276 | 5/2001 |
| EP | 1 130 594 | 9/2001 |
| GB | 2 131 996 | 6/1984 |
| GB | 2 055 503 | 3/1991 |
| GB | 2 312 078 | 10/1997 |
| GB | 2 354 104 | 3/2001 |
| JP | 62-233989 | 10/1987 |
| JP | 4-332985 | 11/1992 |
| JP | 8-235836 | 9/1996 |
| WO | WO 96/36171 | 11/1996 |

OTHER PUBLICATIONS

Anthony DuBoyce, "A Time Code User-Bit Hierarchy for Multidisciplinary Applications", SMPTE Journal, vol. 99, No. 12, Dec. 1990.

Oliver Morgan, "Wrappers and Metadata Sub Group", IEE Colloquium on the EBU-SMPTE Task Force: Building an Infrastructure for Managing Compressed Video Systems, III, London, pp. 5/1-5/7, 1997.

Wilkinson et al., "Tools and Techniques for Globally Unique Content Identification", SMPTE Journal, vol. 109, No. 10, pp. 759-799, Oct. 2000.

* cited by examiner

UMID PROXY & SIMPLIFIED TAPE EDITING RULES

INSERT EDIT WITH VTR ITSELF (VO OR SOUND EFFECT)

| V | UMID #0001 | | |
|---|---|---|---|
| A1 | UMID #0001 | | |
| A2 | UMID #0001 | | |
| A3 | UMID #0001 | | |
| A4 | UMID #0001 | | |
| UMID | Gp UMID #01 | | |

GROUP UMID # 01 = UMID #0001
(V, A1, A2, A3, A4)
TC IN
TC OUT
TAPE ID

THE EFFECTIVE SCOPE OF GROUP UMID

| V | UMID #0001 | | |
|---|---|---|---|
| A1 | UMID #0001 | | |
| A2 | UMID #0001 | | |
| A3 | UMID #0001 | UMID #0002 | UMID #0001 |
| A4 | UMID #0001 | | |
| UMID | UMID #01 (Gp) | UMID #02 (Gp) | UMID #01 (Gp) |

GROUP UMID # 01 = UMID #0001
(V, A1, A2, A4)
UMID #0002
(A3)
TC IN
TC OUT
TAPE ID

METADATA DATABASE

FIG. 11

| | | | | | | | | | | | | | | |
|---|---|---|---|---|---|---|---|---|---|---|---|---|---|---|
| 0 | 0 | 0 | 0 | 1 | 1 | 1 | 1 | 2 | 2 | 2 | 2 | 0 | 1 | 2 | 3 |
| R | R | R | R | G | G | G | G | E | E | E | E | 0 | 1 | 1 | 8 |
| E | E | E | E | R | R | R | R | N | N | N | N | 1 | 9 | 3 | -- |
| D | D | D | D | E | E | E | E | -- | -- | -- | -- | 1 | 9 | 2 | -- |

94 94 94 94 94 (top labels)
104 — 106 — 108 — 110 (bottom brackets)

| | | | | | | | | | | | | | | | |
|---|---|---|---|---|---|---|---|---|---|---|---|---|---|---|---|
| X8 | R | R | R | R | R | R | R | R | E | E | E | E | E | E | E |
| X4 | G | G | G | G | R | R | R | R | E | E | E | E | E | E | E |
| X2 | B | B | L | L | U | U | E | E | | | | | | | |
| X1 | 0 | 1 | 1 | 1 | 9 | 9 | 1 | 3 | 2 | 8 | | | | | |

↑TC           ↑TC

IDENTIFYING, RECORDING AND REPRODUCING INFORMATION

This is a continuation of copending International Application PCT/GB01/01458 having an international filing date of 30 Mar. 2001.

FIELD OF THE INVENTION

A first aspect of the present invention relates to identifying video and/or audio and/or data material.

A second aspect of the present invention relates to digital video tape recording.

A third aspect of the present invention relates to recording apparatus and methods of recording audio and/or video information signals. More particularly the third aspect relates to recording apparatus and methods of recording audio and/or video information signals onto a linear recording medium. Correspondingly, the third aspect also relates to reproducing apparatus and methods of reproducing audio and/or video information signals and in particular information signals recorded onto a linear recording medium.

Material, which may be any one or more of audio, video and data, is represented by information signals which are preferably digital signals.

FIRST ASPECT OF THE INVENTION

Description of the Prior Art

It has been proposed to identify video and/or audio material and/or data using UMIDs which are identifiers which universally uniquely identify material. UMIDs in principle could identify video material to the accuracy of one frame. There is a basic UMID and an extended UMID. A basic UMID has 32 bytes each of 8 bits and an extended UMID has 64 bytes. It may be possible in some circumstances to use a reduced data structure UMID where for instance some data of a plurality of UMIDs is common to the plurality of UMIDs.

It is clearly desirable to associate the identifiers as closely as possible with the material which they identify and most preferably include the identifiers in the material or in the case of material recorded on a recording medium record the identifiers on the medium. However, there is little or no spare data capacity in some media, especially tape. In addition it is desirable to record other data such as Good Shot Markers (GSMs) on the medium with the material. Thus other desirable data competes for space on the media.

Summary of the First Aspect of the Invention

According to the present invention, there is provided a video, audio and/or data signal processing system comprising a recorder for recording video and/or audio and/or data material on a recording medium the recorder including a first generator for generating first material identifiers for identifying respective pieces of material on the medium such that each piece is differentiated from other pieces on the medium, and a second generator for generating second, universally unique, identifiers for pieces of material, second identifiers being generated in respect of one or more of the first identifiers.

A second identifier may be generated for each of the first identifiers. A second identifier may be generated in respect of a group of two or more first identifiers.

The first identifiers, which need to distinguish the pieces of material on the medium, but need not be universally unique, can thus be smaller than universally unique identifiers. For example the first identifiers may comprise only two bytes. That is sufficient to allow the second generator to generate the second identifiers. Also, it minimises the amount of data which need be stored on the medium to identify material thereon allowing other data, e.g. Good Shot Markers, to be recorded.

In preferred embodiments, a medium identifier is provided which identifies the medium. It is for example a serial number. The second generator generates the second identifiers in dependence on the medium identifier and the first identifiers of the material on the medium.

In another embodiment, the medium is housed in a housing supporting a data store. The data store preferably stores the medium identifier and may also store at least one of the first identifiers. Most preferably the first identifiers are recorded on the medium and the store stores only the last produced of the first identifiers to enable the first generator to produce the first identifiers in a regulated manner.

The use of the first identifiers or of the first identifiers plus medium identifiers which may be placed on the medium and/or in the data store allows existing record medium formats especially tape formats to use the identifiers and be incorporated in a production and distribution system which uses universally unique identifiers such as UMIDs and metadata bases. Existing tape formats can accommodate the first identifiers and tape cassettes having data stores are in current use (at the application date of this application).

The embodiments of the invention address the problem of labelling tapes and other recording media by providing the medium identifier. The use of short first identifiers allows GSMs to be recorded. The data store is not essential but can be used if available.

These and other aspects and advantages of the first aspect of the invention are set out in the following description of FIGS. 1 to 30 and in the claims 1 to 37.

SECOND ASPECT OF THE INVENTION

Description of the Prior Art

Several formats of digital video tape have been proposed. The first commercially successful format was the so-called "D1" format, described in the book, "Introduction to the 4:2:2 Digital Video Tape Recorder", Gregory, Pentech Press, 1988. Since then there have been many other formats, either standardised or proprietary.

A feature that these formats have in common is the use of helical scanning. This is a well-established technique in which the tape medium is wrapped at least part of the way around a head drum. One or more rotating read/write heads, mounted on the head drum, sweep out successive slant tracks on the tape medium as the medium is progressed slowly past the head drum. Slant tracks may carry a timecode known in some systems as Vertical Interval Timecode (VITC). Linear tracks may also be used to carry information such as Linear Timecode (LTC), other control information, a cueing audio track and the like.

Each slant track is generally divided up into a number of regions or sectors. Although the precise number and layout of these regions varies from format to format, there are generally one or more video sectors and one or more audio sectors on each slant track. These can store compressed or uncompressed video and audio data. In other systems, data representing each video frame or image, or a group of images, may be recorded onto a group of tracks.

Recently, interest has developed in ways of recording so-called metadata along with the audio and video material. Metadata is additional or accompanying data defining the audio/video material in some fashion, and can include data items such as material identifying codes (e.g. the SMPTE Unique Material Identifier or UMID), bibliographic data such as cast or staff lists, copyright information, equipment used and so on. Of course, if any such codes are to be stored alongside the audio/video material on tape, some data capacity needs to be allocated for its storage.

One previously proposed solution is to store "small" metadata items such as material identifiers using the "user bits", that is a small amount of user-definable data within the LTC areas of the tape. Typically the user bits provide only of the order of 4 bytes (32 bits) per frame, of which some capacity is taken up by existing schemes such as "good shot markers" (GSMs). As an SMPTE UMID occupies at least 32 bytes, and in some forms up to 64 bytes, this solution provides for only a limited storage of this data.

Summary of the Second Aspect of the Invention

This second aspect of the invention provides a digital video tape recorder operable to record video and/or audio material on successive slant tracks, storing a slant track video timecode having a plurality of user-definable data bits, and at least one linear track, storing a linear track timecode having a plurality of user-definable data bits, on a tape medium;

the digital video tape recorder being operable to store a material identifying code in the user-definable bits of the slant track video timecode and in the user-definable bits of the linear track timecode.

The invention recognises that previous attempts to store metadata along with the audio/video material on tape have suffered from a problem during "jog" or very slow motion replay of the material. In these circumstances, the LTC is unreadable because insufficient head/tape relative speed is obtained.

However, the invention recognises that a solution is not necessarily to be found simply by switching to use of the user bits in the VITC (or other slant track timecode) because these tend not to be readable during high speed replay such as shuttle operations.

Instead, embodiments of the invention provide for the material identifying code to be stored effectively twice—in the LTC and in the VITC. This provides for a reliable replay of the material identifying code across a range of replay speeds.

Further aspects and features of the second aspect of the invention are described with reference to FIGS. 28, 29 and 31 and defined in the appended claims 38 to 45.

THIRD ASPECT OF THE INVENTION

Description of the Prior Art

It is known to store audio and video information in a form in which the information may be reproduced when required. Typically this is effected by recording signals representative of the information onto suitable recording media in order to provide a reproducible record of the audio and video information signals. For example the conventional consumer video recorder is provided with an arrangement in which a rotating magnetic head records audio and video information signals in tracks on a magnetic tape. Similarly a hand held video camera or "camcorder" is provided with an arrangement for converting an image formed within a field of view of the camera into video signals which are recorded onto a magnetic tape along with accompanying audio signals. For professional video cameras the preferred medium for recording a reproducible record of the audio and video signals generated by the camera is to record the video signals onto a magnetic tape in some way. The foregoing examples all use magnetic tape to record information, however as will be appreciated magnetic tape is only one example of a linear recording medium in which information signals are recorded onto the medium in some way as the recording medium is driven past a recording head at a rate determined by the band width of the information signal being recorded and the capacity of the recording medium to represent these information signals.

There is a wide variety and a great number of audio and/or video productions which are generated by television companies, by domestic users as well as professional production companies. Sports programs, musical and opera productions, documentaries and light entertainment comedy programmes are but examples of this wide variety of audio and/or video productions. The term audio and/or video will be referred to herein as audio/video and includes any form of information representing sound or visual images or a combination of sound and visual images.

As a result of the rich variety and great number of audio/video productions in existence, the task of managing and navigating through an archive of audio/video productions in order to locate particular features or content items of audio/video material within an archive is considerably time consuming. Similarly editing an audio/video production typically represents a labour intensive task because the audio/video material must be visually scanned by the operator to locate a particular feature of interest. As a result it has been proposed in our co-pending UK patent application number GB 9921235.9 to provide an apparatus and a method for navigating through audio/video information signals using metadata.

The term metadata as used herein refers to and includes any form of information or data which serves to describe either the content of audio/video material or parameters present or used to generate the audio/video material or any other information associated with the audio/video material. Metadata may be, for example, "semantic metadata" which provides contextual/descriptive information about the actual content of the audio/video material. Examples of semantic metadata are the start of periods of dialogue, changes in a scene, introduction of new faces or face positions within a scene or any other items associated with the source content of the audio/video material. The metadata may also be syntactic metadata which is determined and associated with items of equipment or parameters which were used whilst generating the audio/video material such as for example an amount of zoom applied to a camera lens, an aperture and shutter speed setting of the lens, and a time and date when the audio/video material was generated. Although metadata may be recorded with the audio/video material with which it is associated, either on separate parts of a recording medium or on common parts of a recording medium, metadata in the sense used herein is intended for use in navigating and identifying features and essence of the content of the audio/video material, and may, therefore be separated from the audio/video signals when the audio/video signals are reproduced. The metadata is therefore separable from the audio/video signals.

Summary of the Third Aspect of the Invention

According to the third aspect of the present invention there is provided a recording apparatus which is arranged in operation to record audio and/or video information signals onto a linear recording medium, the apparatus comprising a recording drive arranged in operation to record the information signals onto the linear recording medium, and to record metadata associated with the information signals onto the linear recording media with the information signals, wherein the metadata is recorded repeatedly.

An improvement is provided to a recording apparatus which is arranged to record the metadata repeatedly with the audio/video information signals. This is because recording the same metadata repeatedly increases a probability that the metadata will be recovered correctly when the information signals are read from the linear recording medium despite any loss of information. A loss of information may occur as a result of errors produced in recording/reproducing the audio/video information and metadata. A loss of information may also occur when, for example, the linear recording medium is "shuttled" in which the linear recording medium is moved past the recording heads at a rate which is greater than the rate at which the information signals were recorded.

The metadata may comprise a plurality of objects and the recording apparatus may comprise a control processor coupled to the recording drive which is arranged in operation to determine a relative importance of the information represented by the metadata objects and configure the recording drive to record the metadata objects a number of times corresponding to the relative importance of the metadata objects.

As will be appreciated because there is a considerable variation in the type and content of metadata, different types of metadata will vary in value and therefore importance to the audio/video signals with which the metadata is associated. For example, a metadata type of high importance is the Unique Material Identifier (UMID) whereas metadata of low importance is for example the F-stop or aperture setting of the camera which was used whilst the audio/video information signals were being generated. By recording the metadata repeatedly in accordance with the importance of the metadata, a greater immunity to the effect of errors and to any loss of information which may occur when the information signals and metadata are being reproduced from the linear recording medium is unequally provided, with the metadata of greater importance being provided with greater protection.

Dividing the metadata into metadata objects which define a type and therefore relative value of the metadata, provides an estimate of the relative importance of the metadata. This is effected by the control processor which also configures the recording drive to record the metadata objects a number of times determined in accordance with the relative importance of the metadata which the objects represent.

The recording drive may be arranged in operation to record the information signals onto the linear recording medium at a recording rate, and the number of times the metadata objects are repeated may be determined by the control processor from a combination of the relative importance and a reading rate at which the recorded information signals may be read from the linear recording medium.

When recording information signals on to a linear recording medium such as a magnetic tape, the information signals are arranged to be recorded on to the magnetic tape by driving the tape at a recording speed past a recording head which is excited by the information signals. The rate at which the tape is driven is determined in accordance with the bandwidth of the information signals, and the capacity of the recording medium to represent these signals. The rate at which the tape is driven when recording the information signals will be known herein as the recording rate. When the information signals are reproduced from the recording medium, the recording medium is again driven passed read heads which read the information signals from the magnetic tape. The rate of driving the recording medium passed the reading head is known herein as the reading rate and in order to recover all the information signals, the reading rate should be the same as the recording rate. However, in a mode known as "shuttle" mode, the reading rate may be increased so that although not all the information signals may be recovered from the recording medium an amount is recovered which is sufficient to provide a representation of the information signals for fast searching. Thus, an effect of shuttle mode is to reduce an amount of information which is recovered from the linear recording medium. Therefore, by repeating the same metadata object in accordance with the relative importance of the metadata object, the more important metadata objects are more likely to be correctly recovered.

Furthermore the control processor may operate to determine the number of times the metadata objects are repeated from the relative importance and a number of times the reading rate is greater than the recording rate. The number of times the reading rate is greater than the recording rate provides an integer indication of the number of times the metadata object must be repeated in order for the metadata object to be recovered during shuttle mode.

In a preferred embodiment the recording drive may operate to record the information signals and the metadata on to the linear recording medium whereby the information signals and the metadata may be separated when read from the linear recording medium.

The control processor may be arranged in operation to assign each of the metadata objects to one of a plurality of categories of relative importance and to allocate each of the metadata objects to one of the categories of relative importance the number of times the metadata objects are repeat recorded being pre-determined for each of the categories.

An improvement is provided by arranging the metadata objects into a plurality of categories and repeat recording the metadata objects in accordance with the category. This provides a reproducing apparatus arranged in operation to reproduced the information signals with an implicit reference to the number of times the same metadata object has been recorded and therefore in dependence upon the reproducing rate the reproducing apparatus may determine whether the same metadata object has been read more than once. In this way, a probability of successfully recovering a metadata object may be increased by allocating the metadata object to a category which has a greater number of predetermined repetitions when recorded. Thus by assessing the relative importance, the more important information may be allocated to a category of higher importance and thereby this information is more likely to be recovered when the metadata and information signals are reproduced.

In a preferred embodiment, for each of the categories of relative importance the control processor may be arranged in operation to record the same allocated metadata object in each of a plurality of adjacent cells of the recording medium for the predetermined number of times and record a subsequent metadata object allocated to the same category for the predetermined number of times in a corresponding plurality of adjacent cells. Furthermore the same metadata object may be recorded with reference to a temporal marker recorded with the information signals and the metadata objects. In this way when the reproducing apparatus is recovering the metadata objects, a plurality of cells may be read from the linear recording medium and with reference to temporal marker the reproducing apparatus may determine whether the same metadata object has been recovered.

As an alternative arrangement for repeat recording metadata objects onto the linear recording medium the control processor may be arranged in operation to form metadata packets having a plurality of fields, and to control the recording drive to record the metadata packets on to the linear recording medium, whereby the metadata objects are repeated the pre-determined number of times.

Arranging the metadata objects into packets provides a predefined unit which may contain different metadata objects or the same metadata objects which can be recorded in a controlled way so that recovery of the metadata objects may be facilitated.

The control processor may allocate the metadata objects to the fields of the packets, whereby the metadata object is repeated in the fields of at least one of the packets.

Furthermore the control processor may be arranged in operation to allocate a different metadata object to at least two of the fields of the packet and record repeatedly the metadata packet the predetermined number of times. By providing the packet with different metadata objects and recording the metadata packet the determined number of times for the relative importance of the metadata objects, the relative protection provided by the repeat recording is effected for each of the different fields within the metadata packet.

The control processor may be arranged in operation to provide each of the metadata packets with a header field and to allocate header information to the header field which is indicative of the metadata objects within the fields of the packet.

Providing the metadata packets with a header which contains information which represents the content of the fields of the packets, facilitates identification of the metadata packets and recovery of the metadata objects from packets which have been repeatedly recorded.

The control processor may be arranged in operation to change the header information between successive packets recorded repeatedly onto the linear recording medium which have different metadata objects.

Changing the header information between successive packets which have different metadata objects provides a simple and convenient way of recognising where metadata packets which are repeatedly recorded change from one group to another. By detecting the change in the header information a reproducing apparatus may determine whether the metadata packets recovered from the recording medium contain more than one metadata packet which is the same. The reproducing apparatus may therefore discard redundant metadata packets which are those which are recovered after a first metadata packet of any one type has been recovered.

In a preferred embodiment the linear recording medium is a magnetic tape and the recording drive has a rotating head which is configured in operation to record the information signals in helical scan tracks disposed at an angle to a linear axis of the recording tape and a linear recording head which is configured in operation to record the metadata along the linear tracks of the magnetic tape at a position adjacent to the helical scan tracks. In preferred embodiments the linear tracks are allocated to the user specified bits and the time code allocated to the information signals.

According to the third aspect of the present invention there is also provided a reproducing apparatus which is arranged in operation to recover audio and/or video information signals recorded with metadata associated with the information signals onto a linear recording medium using a recording apparatus as herein before described, the reproducing apparatus comprising a reading drive which operates to recover the information signals from the linear recording medium and the metadata from the linear recording medium and a read control processor which is arranged in operation to determine whether the same metadata has been read by the reading drive from the linear recording medium, to discard the metadata which has been read more than once and to reproduce the information signals with the metadata.

According to the third aspect of the present invention there is also provided a method of recording audio and/or video information signals onto a linear recording medium comprising the steps of recording the information signals onto the linear recording medium, recording metadata associated with the information signals onto the linear recording medium with the information signals, wherein the metadata is recorded repeatedly.

Further aspects and features of the present invention are defined in the appended claims 46 to 85 and in the following description of FIGS. 32 to 41.

For a better understanding of the present invention, reference will now be made, by way of example, to the accompanying drawings in which:

FIGS. 1 to 11 illustrate illustrative versions of the first aspect of the present invention;

Figure 1:
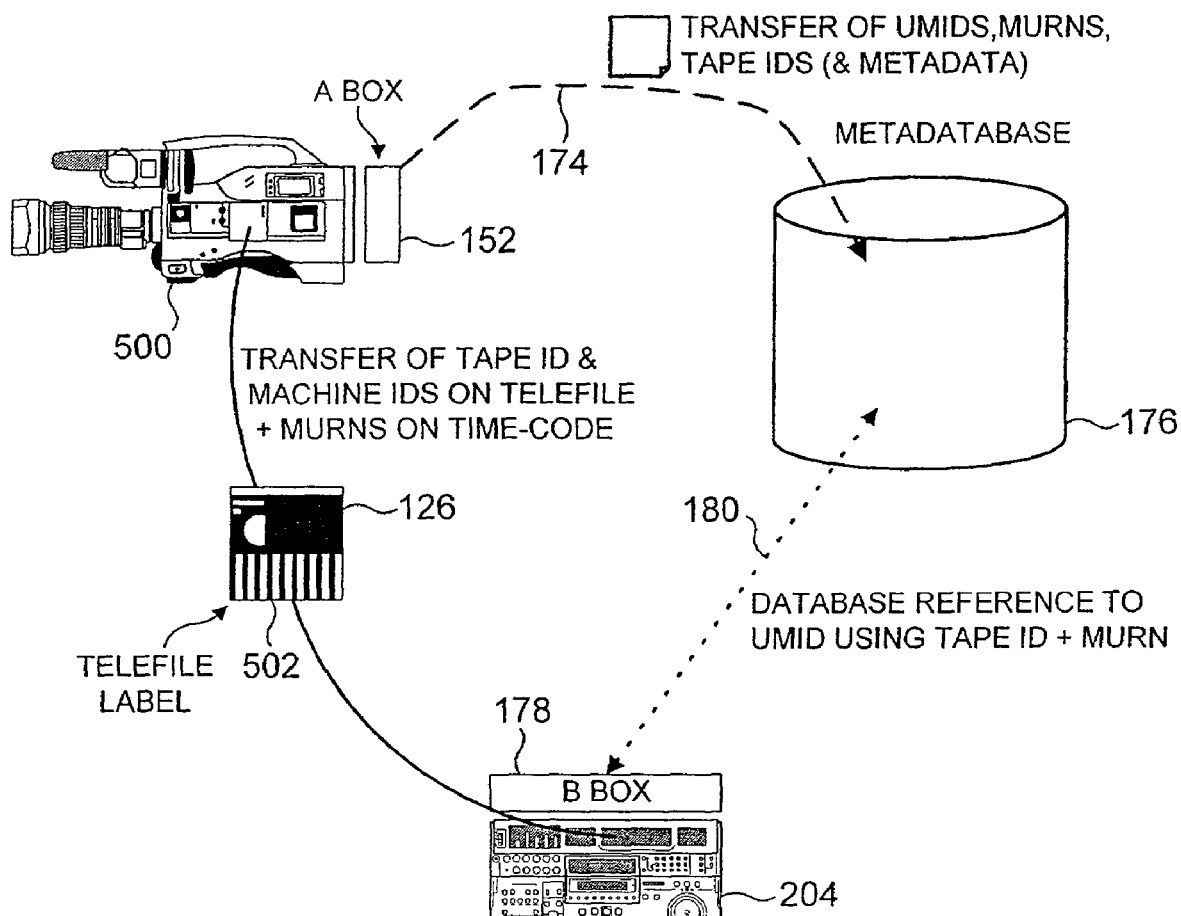
Figure 2:
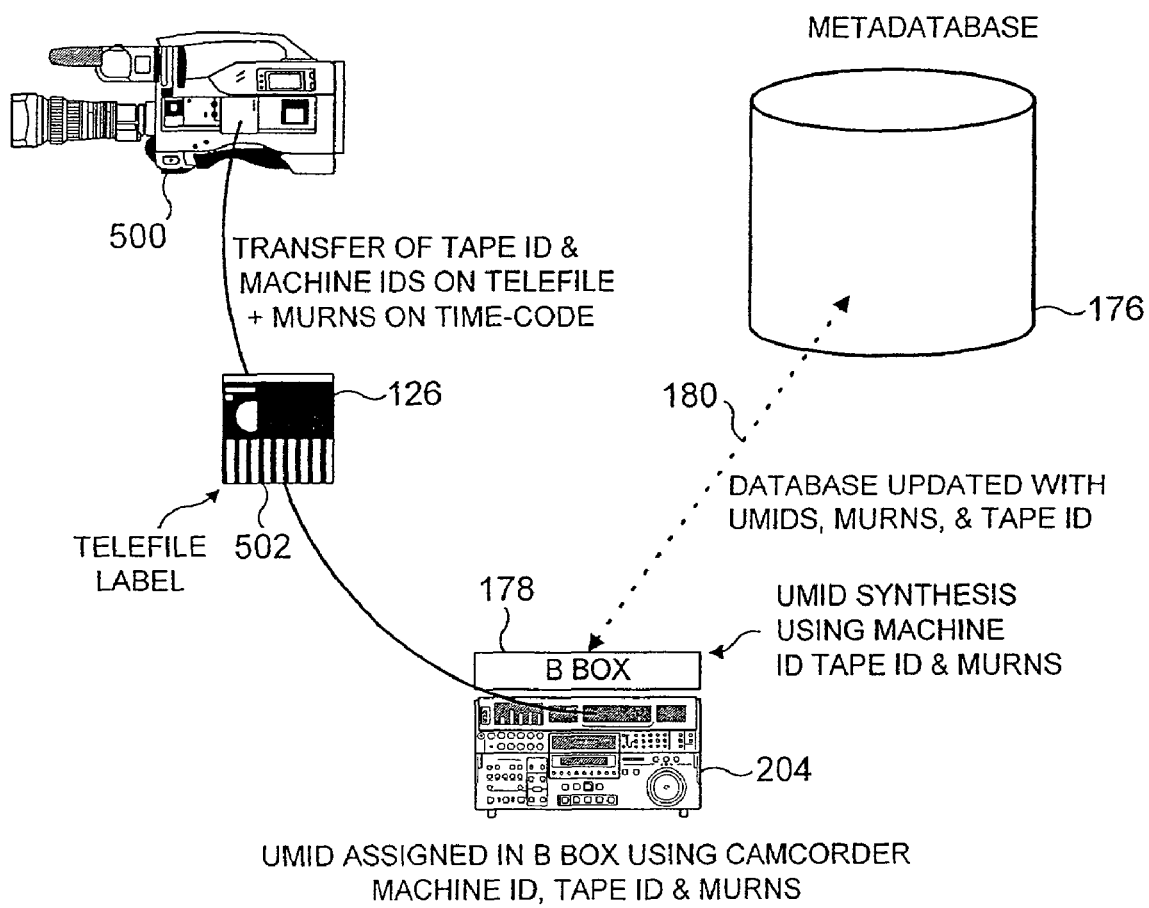
Figure 3:
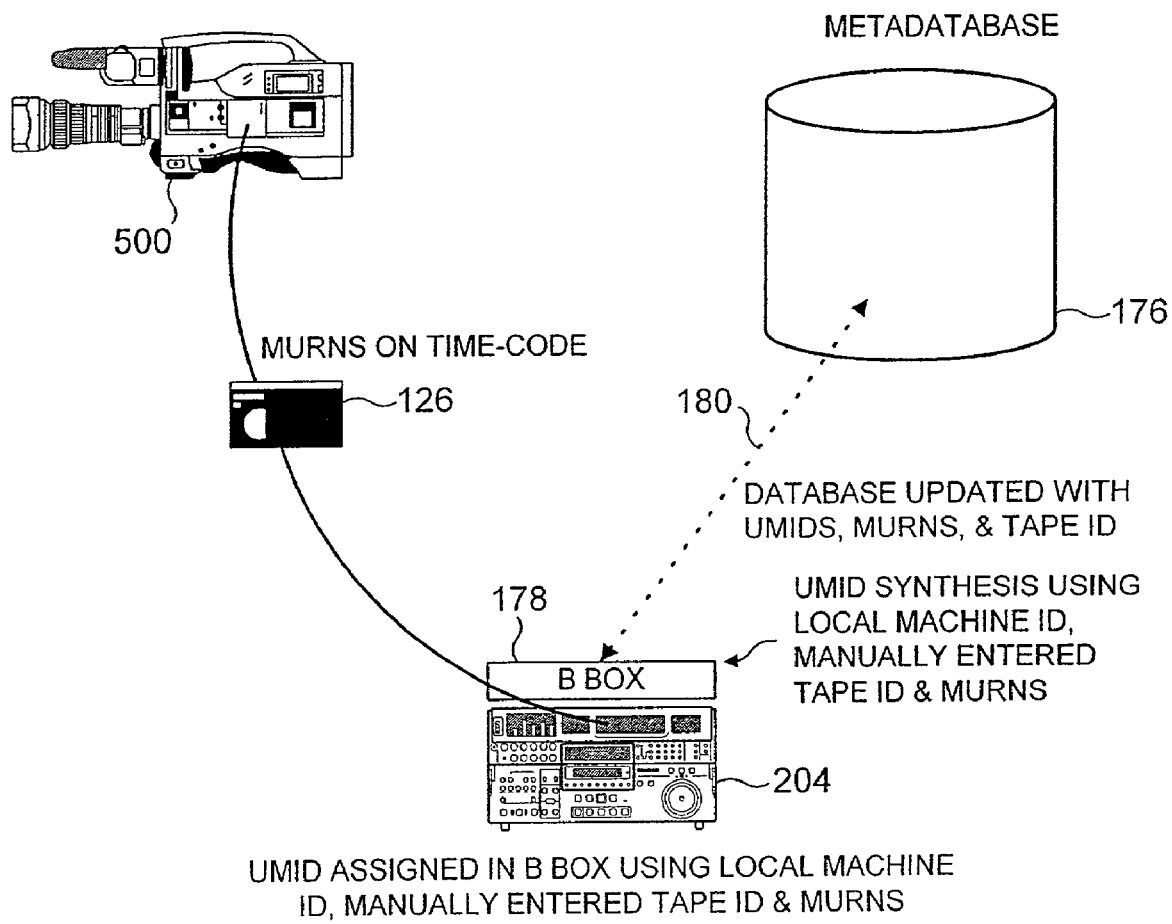
Figure 4:
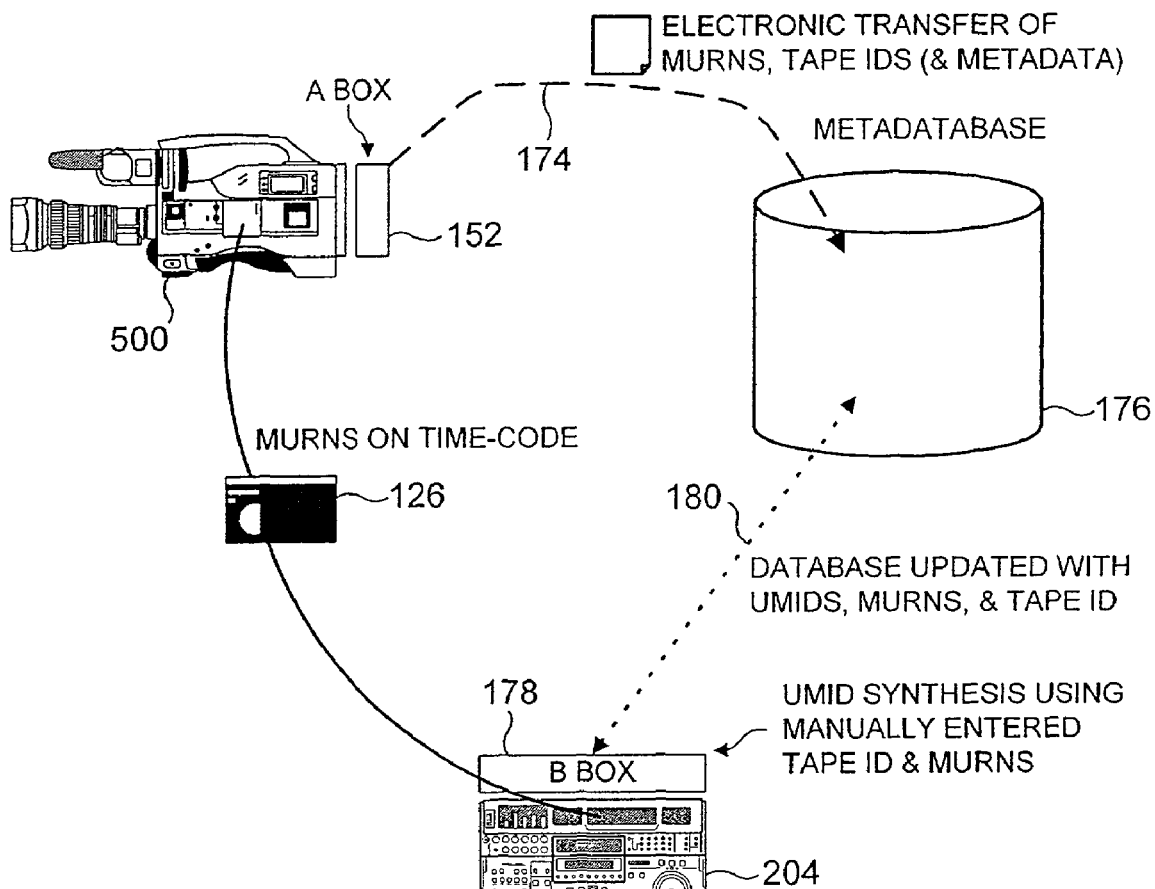
Figure 33:
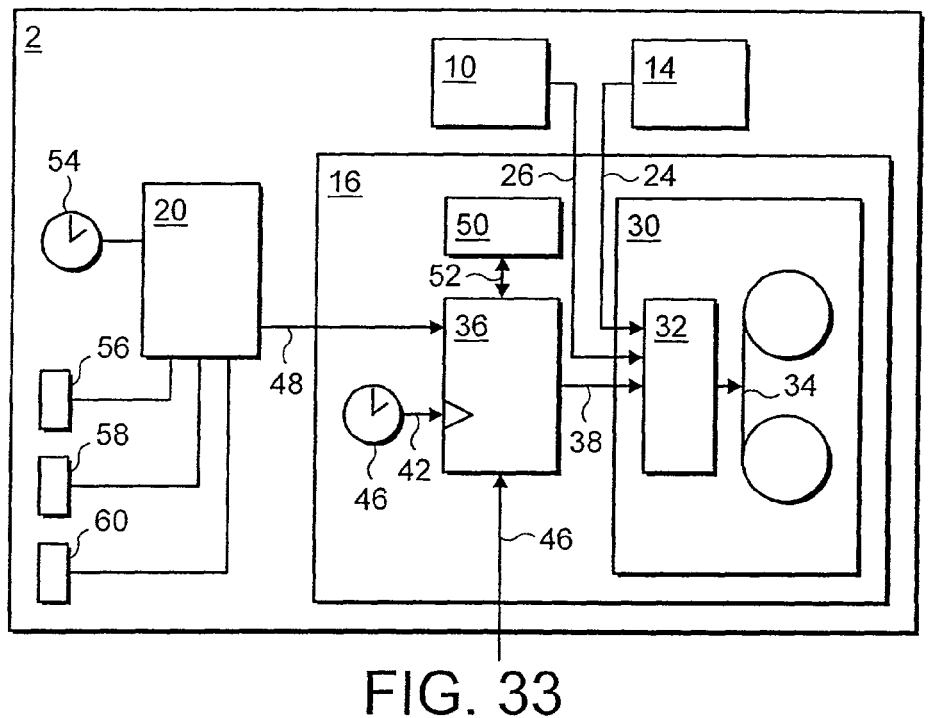
Figure 34A:
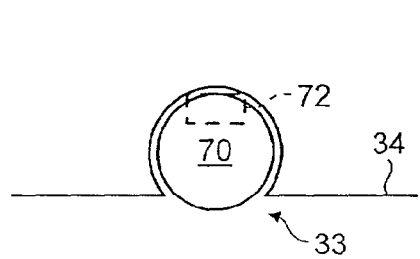
Figure 34B:
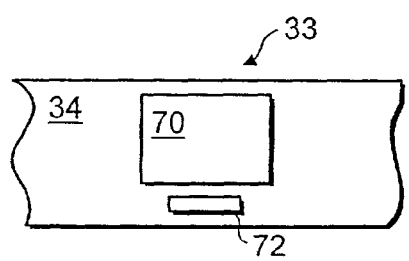
Figure 35:
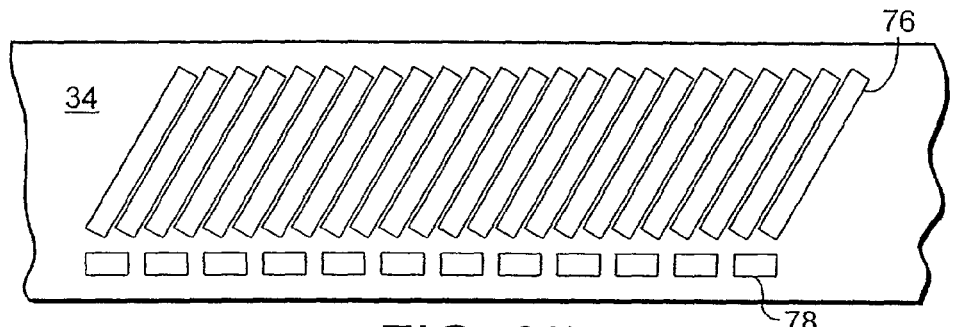
Figure 36A:
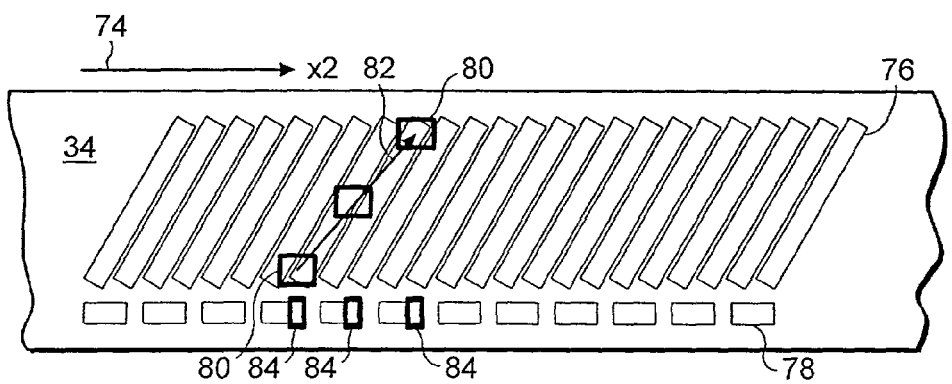
Figure 36B:
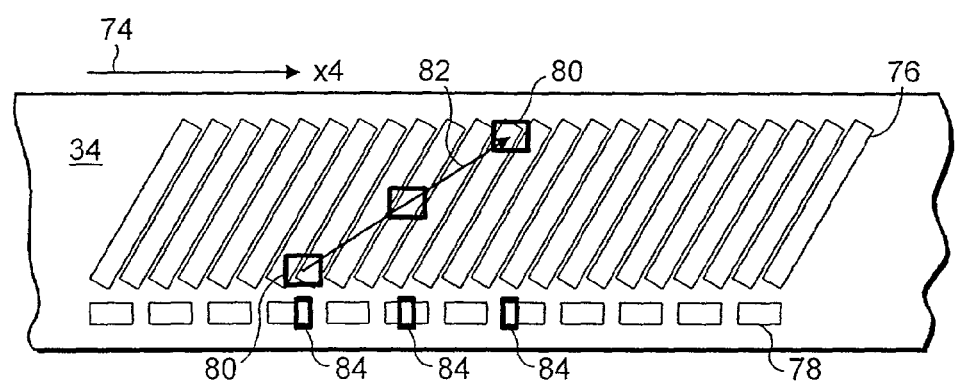
Figure 36C:
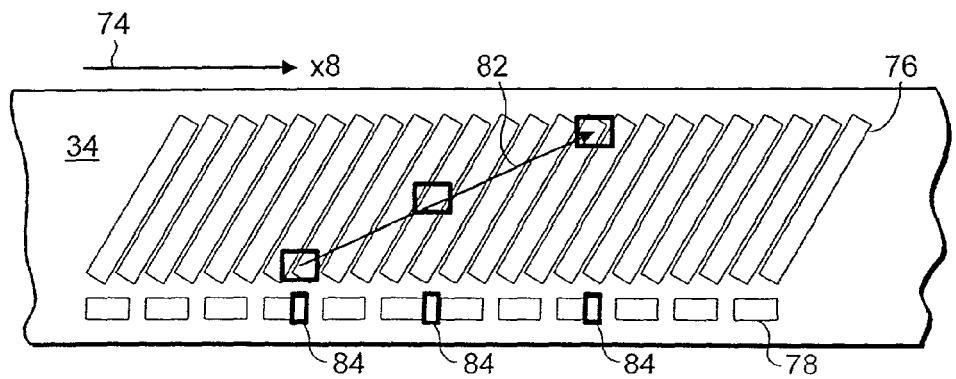
Figures 37, 38, 39:
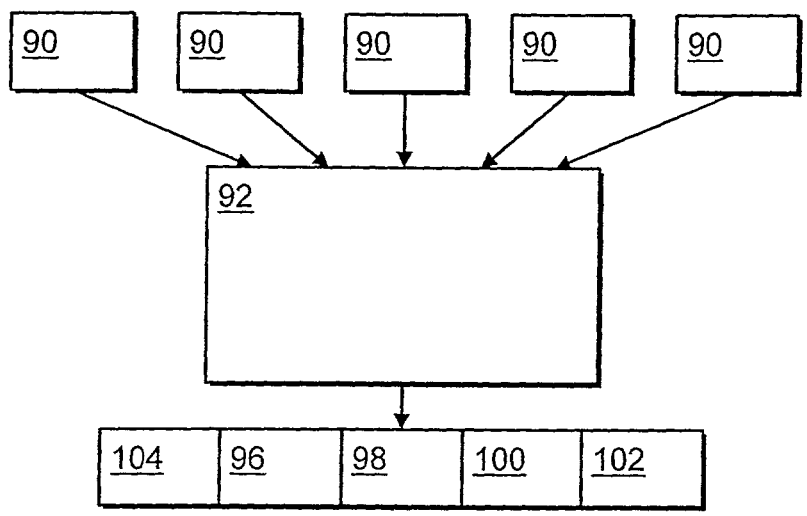
Figure 40:
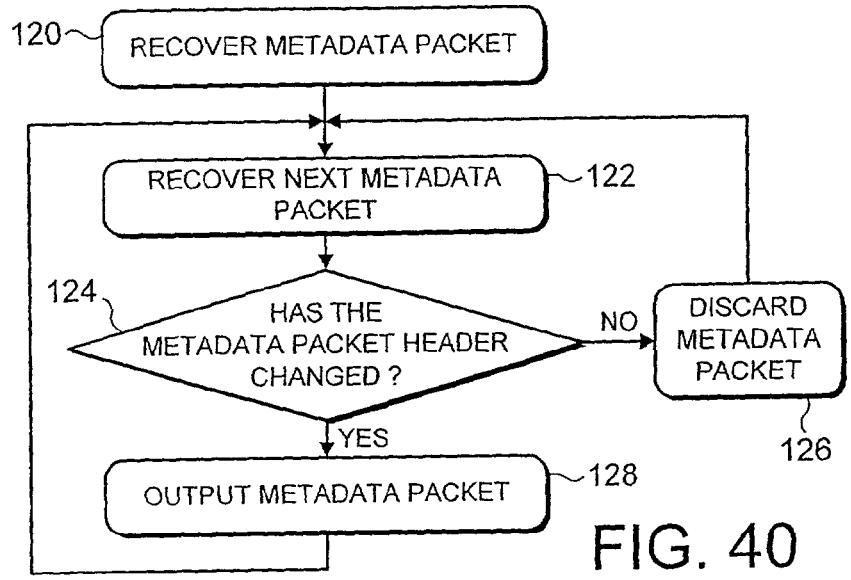
Figure 41:
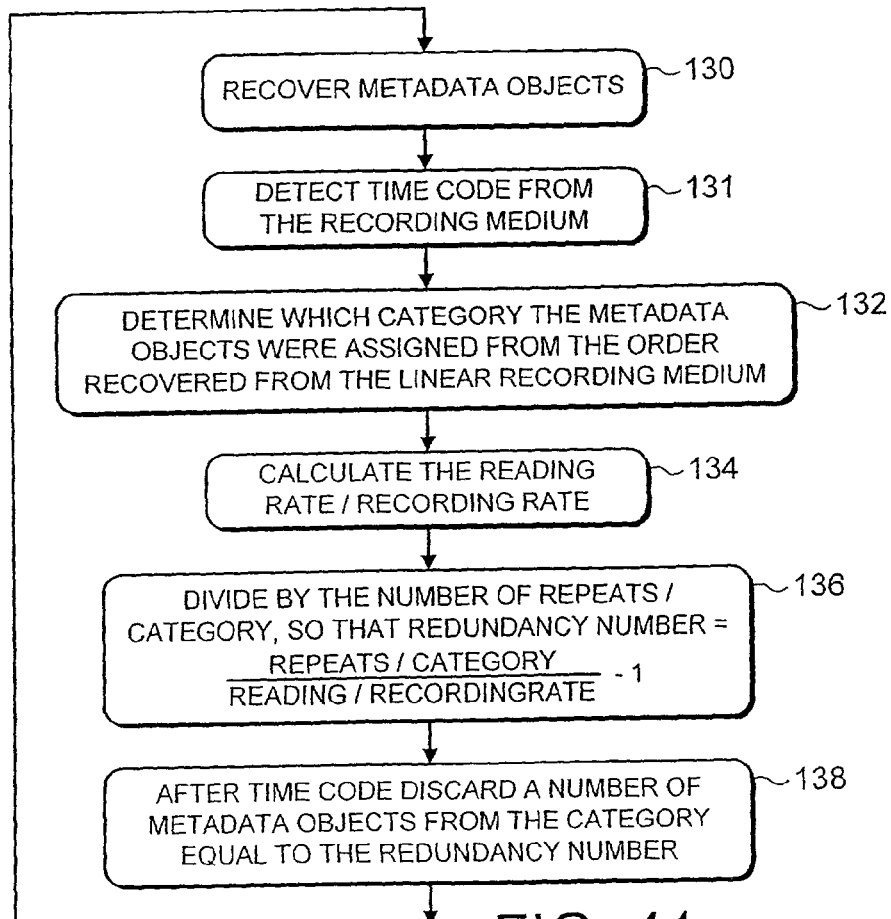

FIG. 33 is a schematic block diagram of part of the video camera shown in FIG. 1 which includes a recording apparatus, FIG. 34A is a schematic block plan view of recording heads arranged to record information onto the magnetic tape within the recording apparatus shown in FIG. 2, and FIG. 34B is an elevation view of the plan view shown in FIG. 3A, FIG. 35 is a schematic representation of a position and layout of information recorded onto a magnetic recording tape shown in FIG. 3, FIG. 36A is a representation of the magnetic recording tape shown in FIG. 4 read at twice the recording speed, FIG. 36B is a representation of the magnetic tape shown in FIG. 4 read at four times the recording speed, and FIG. 36C is a representation of the magnetic tape shown in FIG. 4 read at eight times the recording speed, FIG. 37 is an illustration of a process in which metadata objects are formed into a metadata packet, FIG. 38 is a representation of an arrangement of metadata objects recorded onto the magnetic recording tape, FIG. 39 is a representation of a further arrangement of metadata objects recorded onto the magnetic recording tape, FIG. 40 is a flow diagram representing a method for producing the arrangement of metadata objects represented in FIG. 38, and FIG. 41 is a flow diagram representing a method for producing the arrangement of metadata objects represented in FIG. 39.

OVERVIEW—FIRST ASPECT OF THE INVENTION—FIGS. 1 to 11

The following description refers to:

UMIDs—which are described with reference to FIGS. 12 and 13;

Metadata—which is described with reference to FIG. 14;

A Box—which is described with reference to FIGS. 15 to 21;

B Box which is described with reference to—FIGS. 22 to 27; and,

Tape IDs which are described with reference to FIGS. 28 to 30.

Referring to FIG. 1, a camcorder 500 is equipped with an A-box 152. The camcorder 500 records video and audio material on a recording medium which may be a tape 126 or a disc for example. The following description refers to tape for convenience and because tape is currently the most common recording medium for camcorders. The tape is housed in a cassette which supports a data store 502 additional to the tape. The store 502 may be a Telefile (Trade Mark). Recorded material is transferred on the tape 126 to a VTR 204 which is connected to a B-Box 178. Both the A-Box and the B-Box are linked by communication links 174 and 180 to a database processor 176 storing a metadata base. Examples of metadata stored in the database are given in the section Metadata below. The metadata relates to the material recorded on the tape 126. Metadata may be recorded on the tape as described herein below with reference to FIGS. 32 to 41.

In the present embodiment of the invention, the metadata is linked to the material by UMIDs, which are described in the section UMIDs below and, in accordance with the invention, by at least MURNs—Material Reference Numbers. UMIDs which are universally unique identifiers have 23, 32 or 64 bytes as described below. MURNs have 2 bytes in currently preferred embodiments of the invention and are intended to uniquely identify each piece of material on the tape but not be universally unique. Together with the time code bits, the MURNs identify each clip on the tape to frame accuracy.

In the embodiment of FIG. 1, a tape ID is recorded in the datastore 502. Also the tape ID may be applied to the tape. The tape ID may be recorded on the tape during a prestriping process.

MURNs are generated as the material is recorded on the tape. The MURNs are preferably recorded in the user bits of tape time codes. That may be done in a similar way as recording tape IDs in time code as described below as described with reference to FIGS. 28, 29 and 31. Preferably, at least the last recorded one of the MURNs is also recorded in the data store 502. All the MURNs may be recorded in the data store 502 but that is not essential in this embodiment.

The camcorder 500 has a machine ID which is for example the serial number of the camcorder. Preferably in this embodiment the machine ID is recorded in the data store 502. It may be recorded on the tape if there is sufficient space.

The tape 126, after material is recorded on it, is transferred to a VTR 204 which is coupled to a B-Box 178. The VTR 204 and B-Box 178 together read the MURNs, the Tape ID, and the machine ID, and the B-Box associates a UMID with each MURN. In this embodiment, the UMID is retrieved from the database 176. Each UMID is associated with a combination of the Tape ID and a MURN and the associated identifiers (UMID, Tape ID and MURN) are stored in the database 176. For that purpose the B-Box is coupled to the database processor via a communications link which may be a network link, e.g. an internet link.

In the embodiment of FIG. 1, the A-Box 152 generates, for each MURN, a UMID and transfers to the database 176, via a communications link 174, the UMIDs, MURNs, tape ID and any metadata which is generated at the A-Box. Thus the UMID is available in the database to be retrieved by the B-Box 178.

Good Shot Markers (GSMs) and/or other metadata may be stored on the tape.

Referring to FIG. 2, the embodiment of FIG. 2 differs from that of FIG. 1 in that the A-Box 152 is omitted, MURNs, Tape ID and Machine ID are generated by the camcorder without the A-Box and UMIDs are generated by the B-Box instead of being retrieved from the database 176. Preferably, the Tape ID and machine ID are recorded in the datastore 502 and the MURNs are recorded in the user bits of time codes on the tape. However they may be recorded in the other ways described with reference to the embodiment of FIG. 1. The UMIDs are synthesised in the B-Box using machine ID, Tape ID and MURNs.

Good Shot Markers (GSMs) and/or other metadata may be stored on the tape.

Referring to FIG. 3, the embodiment of FIG. 3 differs from that of FIG. 1 in that: the A-Box 152 is omitted; MURNs are generated by the camcorder without the A-Box; Tape ID is manually entered at the B-Box; machine ID identifying the camcorder is not used; the tape has no datastore; and UMIDs are generated by the B-Box instead of being retrieved from the database 176. The MURNs are recorded in the user bits of time codes on the tape. The UMIDs are synthesised in the B-Box using the MURNs, a machine ID identifying the VTR 204 and the manually entered Tape ID. Preferably the Tape ID is manually written on a physical label on the cassette. The UMIDs and associated MURNs and Tape ID are transferred to the database 176 via the link 180. It is possible that MURNs are duplicated on a tape in the absence of the datastore: that may be detected by the database 176.

Good Shot Markers (GSMs) and/or other metadata may be stored on the tape.

Referring to FIG. 4, the embodiment of FIG. 4 differs from that of FIG. 1 in that: the tape has no datastore 176; the Tape ID is manually entered at the B-Box; machine ID identifying the camcorder 500 is not used; and UMIDs are generated by the B-Box instead of being retrieved from the database 176. The MURNs are recorded in the user bits of time codes on the tape. The UMIDs are synthesised in the B-Box using the MURNs, and the manually entered Tape ID. The Tape ID is manually written on a physical label on the cassette. The UMIDs and associated MURNs and Tape ID are transferred to the database 176 via the link 180. It is possible that MURNs are duplicated on a tape in the absence of the datastore: that may be detected by the database 176.

In the embodiment of FIG. 4 the A-Box 152 associates with each MURN, any metadata which is generated at the A-Box and the tape ID, which is entered at the A-Box and also written on a label on the tape 126. Thus the database can associate the metadata, MURNs and tape ID transferred to it from the A-Box with the UMIDs and associated MURNs and tape ID from the B-Box.

The B-Box may also use the machine ID of the camcorder 500 in association with the UMIDs, and the A-Box may transfer the machine ID of the camcorder if that ID is recorded on the tape or written on the label of the tape.

The Tape ID may be recorded on the tape and thus it may be detected by the VTR 204 and B-Box avoiding the need to manually enter it at the B-Box.

Good Shot Markers (GSMs) and/or other metadata may be stored on the tape.

Figure 5:
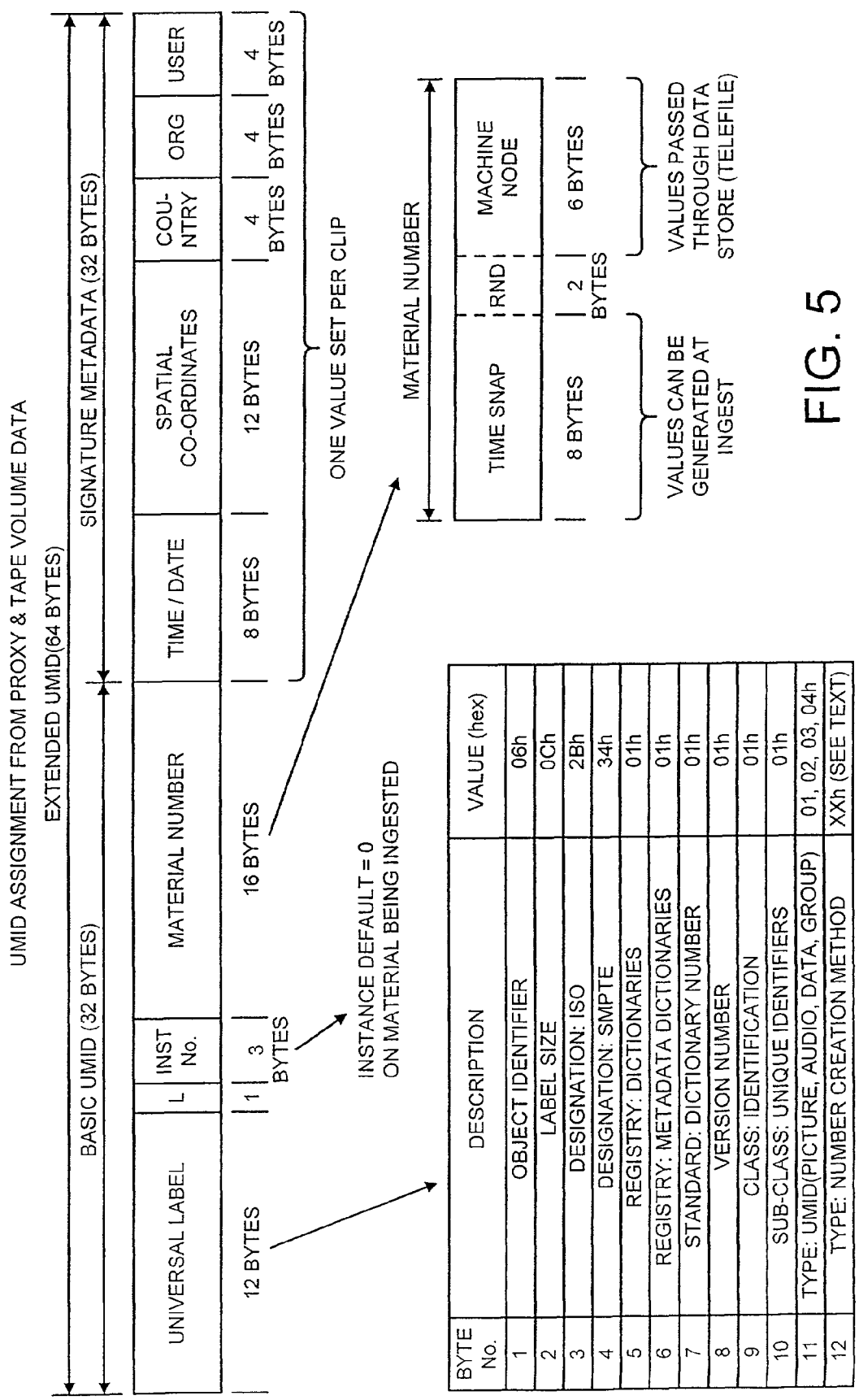

Referring to FIG. 5, there is shown a UMID which is further described in the section UMIDs below. The UMID may be generated based on the data in the datastore 502 or recorded on the tape, such data including at least the MURNs and preferably also the Tape ID and most preferably also the machine ID. FIG. 5 assumes that data is stored in the datastore, (Telefile) 502. When generating the UMID:—the UMID type value, byte 11 of the universal label, is set, the default being 04 H, i.e. group; the creation type, byte 12 of the universal label, is set locally at ingestion; and the material number is set, it comprising 8 bytes of time snap set at ingest, 2 bytes of random Number (Rnd) and 6 bytes of Machine Node which is made up of data values passed through the datastore 502.

Figure 6:
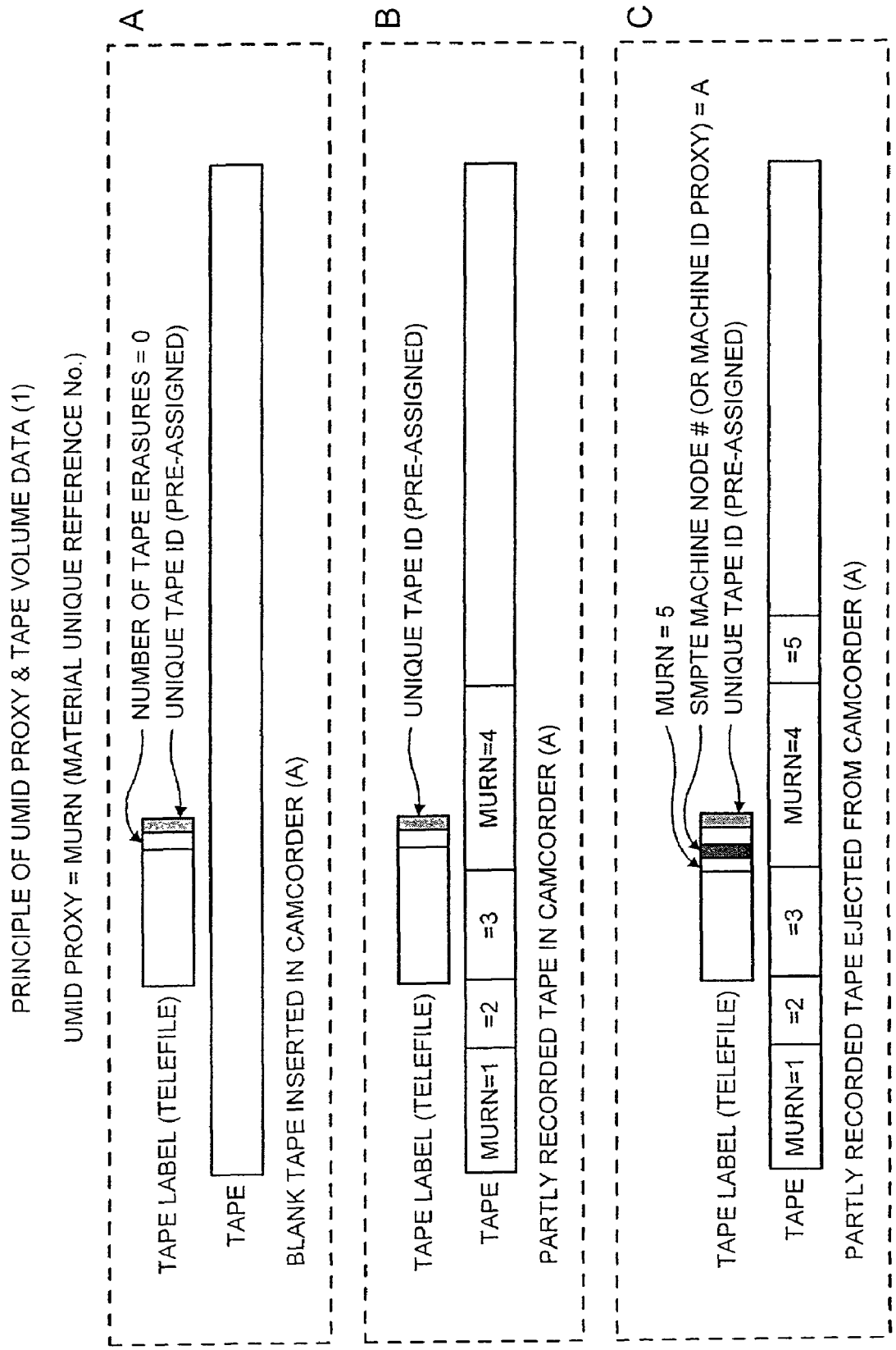
Figure 7:
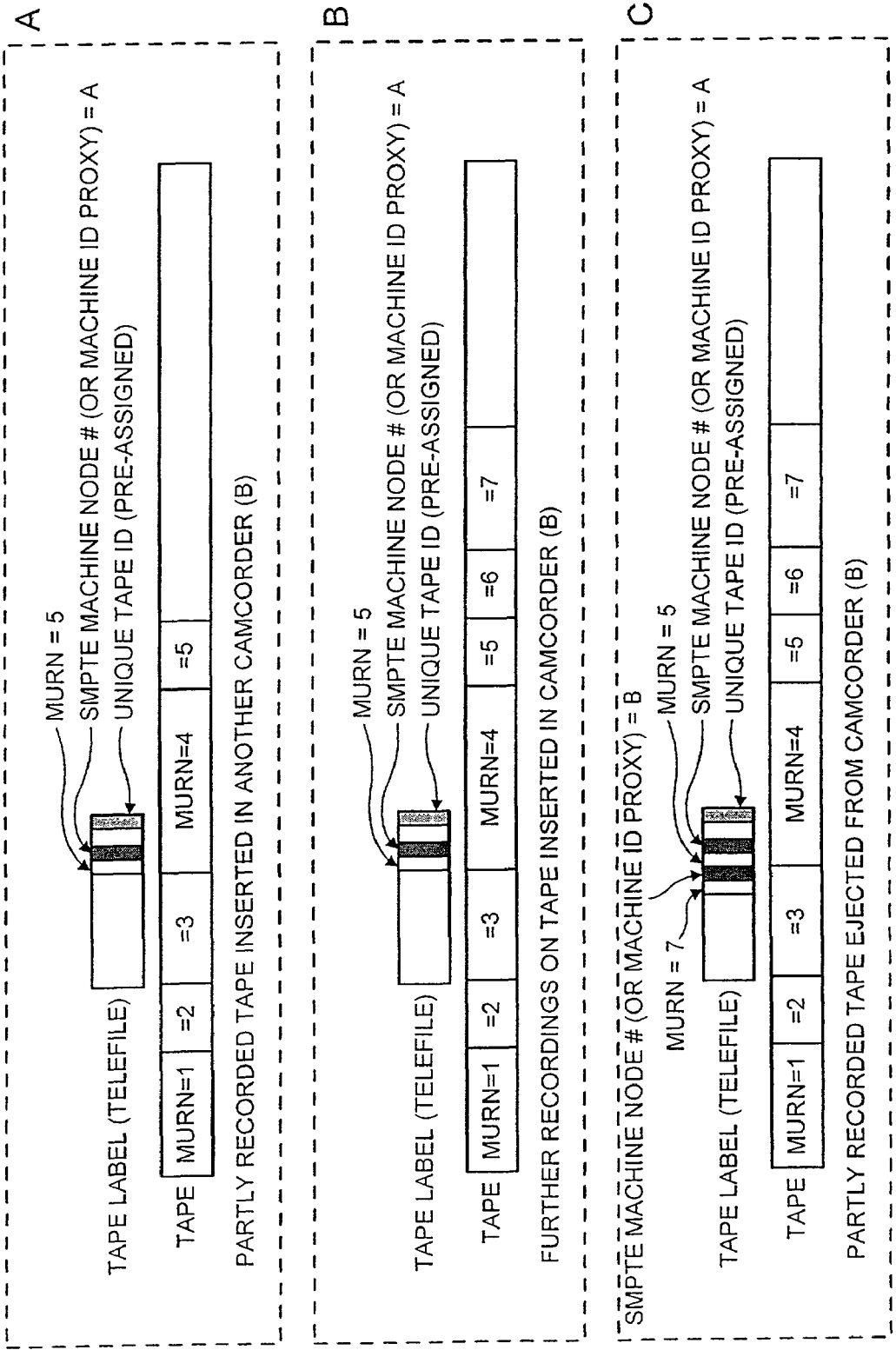
Figure 8:
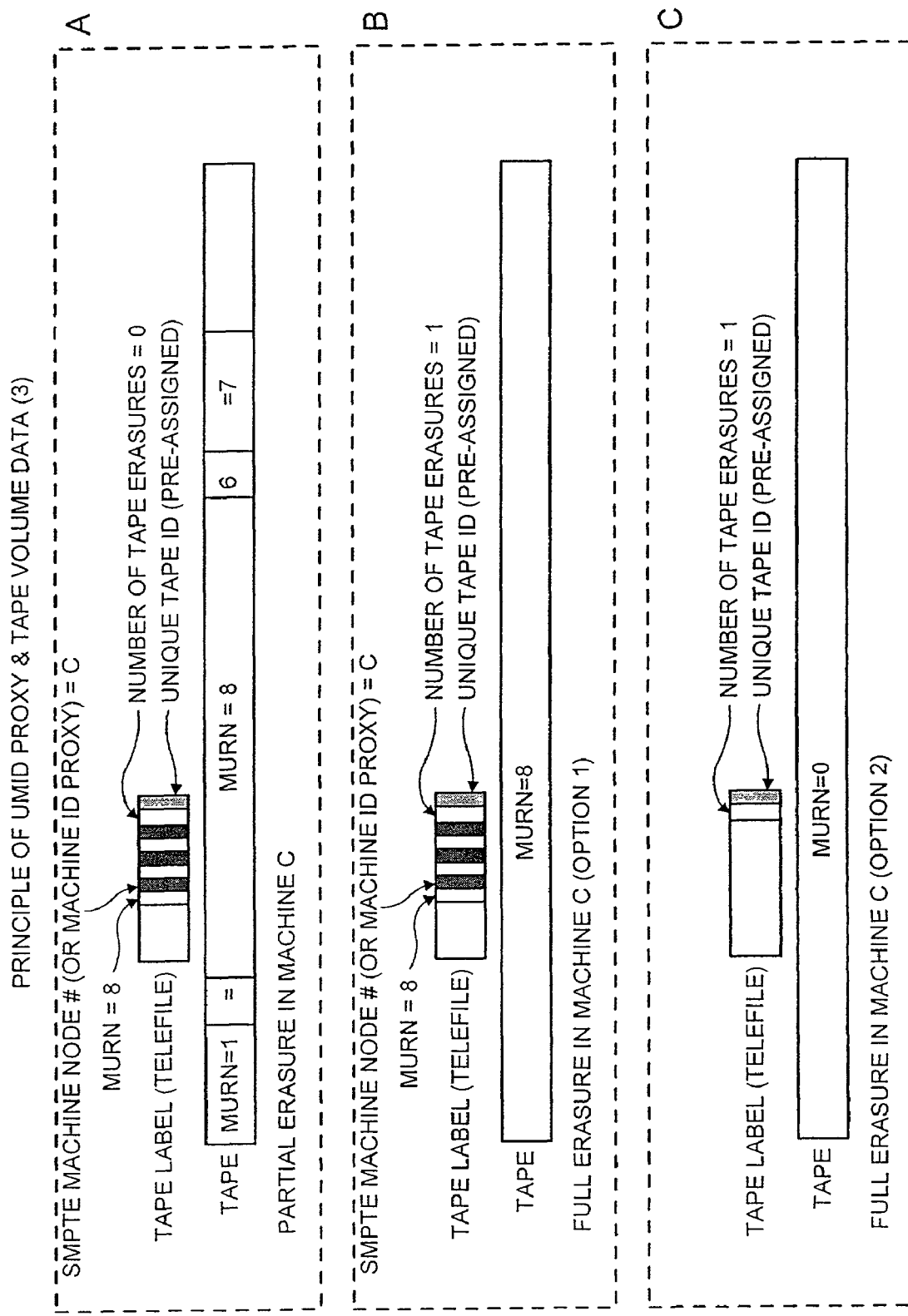

Referring to FIGS. 6 to 8, an example of the operation of the system of FIG. 1 will be given. In FIGS. 6 to 8 "tape label"

denotes the datastore 502, e.g. a Telefile. It is assumed the Tape ID is stored in at least the datastore 502.

Referring to FIG. 6A, a blank tape is inserted in to the camcorder 500. The datastore stores the Tape ID and a number 0 indicating the number of tape erasures.

Referring to FIG. 6B, assume 4 clips have been recorded on the tape by the same camcorder 500, camcorder A. The clips have respective MURNs 1 to 4 allocated to them and recorded in the user bits of time codes on the tape. As shown in FIG. 6C, assume one more clip with MURN 5 is recorded on the tape and then the tape is ejected from the camcorder 500. The MURN 5 is stored in the datastore 502 and the machine ID (or a shortened proxy version thereof) is stored in the datastore 502. The MURN 5 is recorded in the data store to allow the next correct MURN number to be generated when the tape is next used.

Referring to FIG. 7A assume the same tape is inserted into another camcorder B. The datastore 502 indicates the last recorded MURN is 5. As shown in FIG. 7B, more clips are recorded on the tape, and the clips are given MURNs 6, 7 . . . As shown in FIG. 7C, when the tape is ejected from the camcorder B, the Machine ID B is recorded in the data store together with the last recorded MURN (7). The machine ID of camcorder A is retained and the last MURN (5) recorded with machine A is retained.

Referring to FIG. 8A, assume the same tape is inserted into another machine C which is for example a VTR. The ID, C, of the machine is recorded in the datastore 502. The tape is partially erased, in this example over clips 2 to 6. The erased zone is denoted by MURN 8 which is recorded in the data store. An erasure number=1 is stored in data store 502.

FIGS. 8B and C show alternatives for full erasure. In FIG. 8B, the fully erased tape is given MURN 8 which is recorded in the datastore and the ersure number is stored as 1 in the datastore. In FIG. 8C, the fully erased tape is given MURN 0 and the datastore is cleared except for the Tape ID.

Those skilled in the art will be able to relate FIGS. 6 to 8 to FIGS. 2 to 4.

Figure 9:
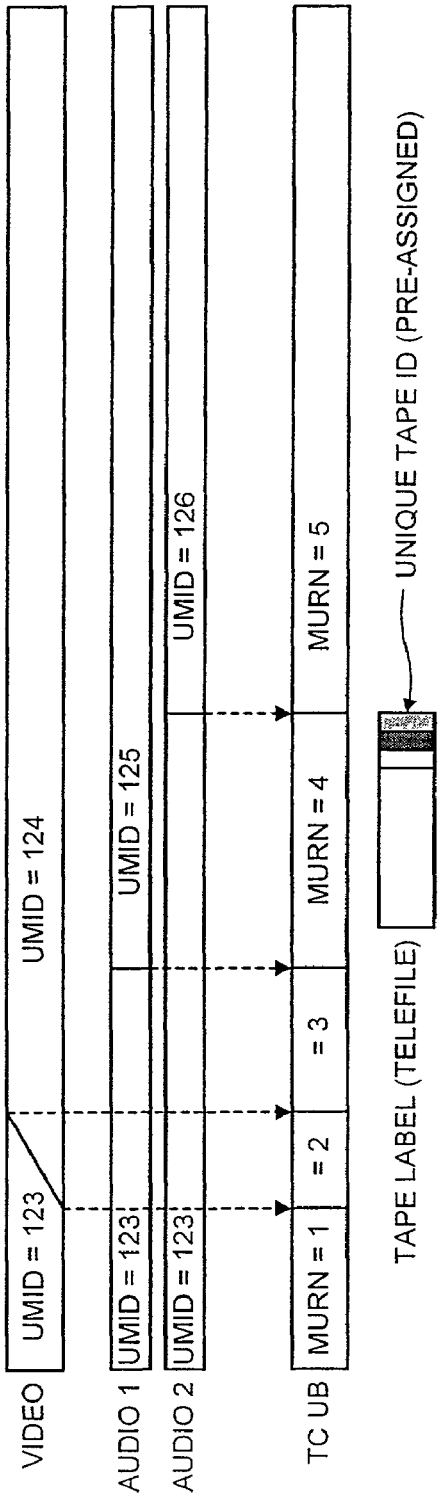
Figure 10:
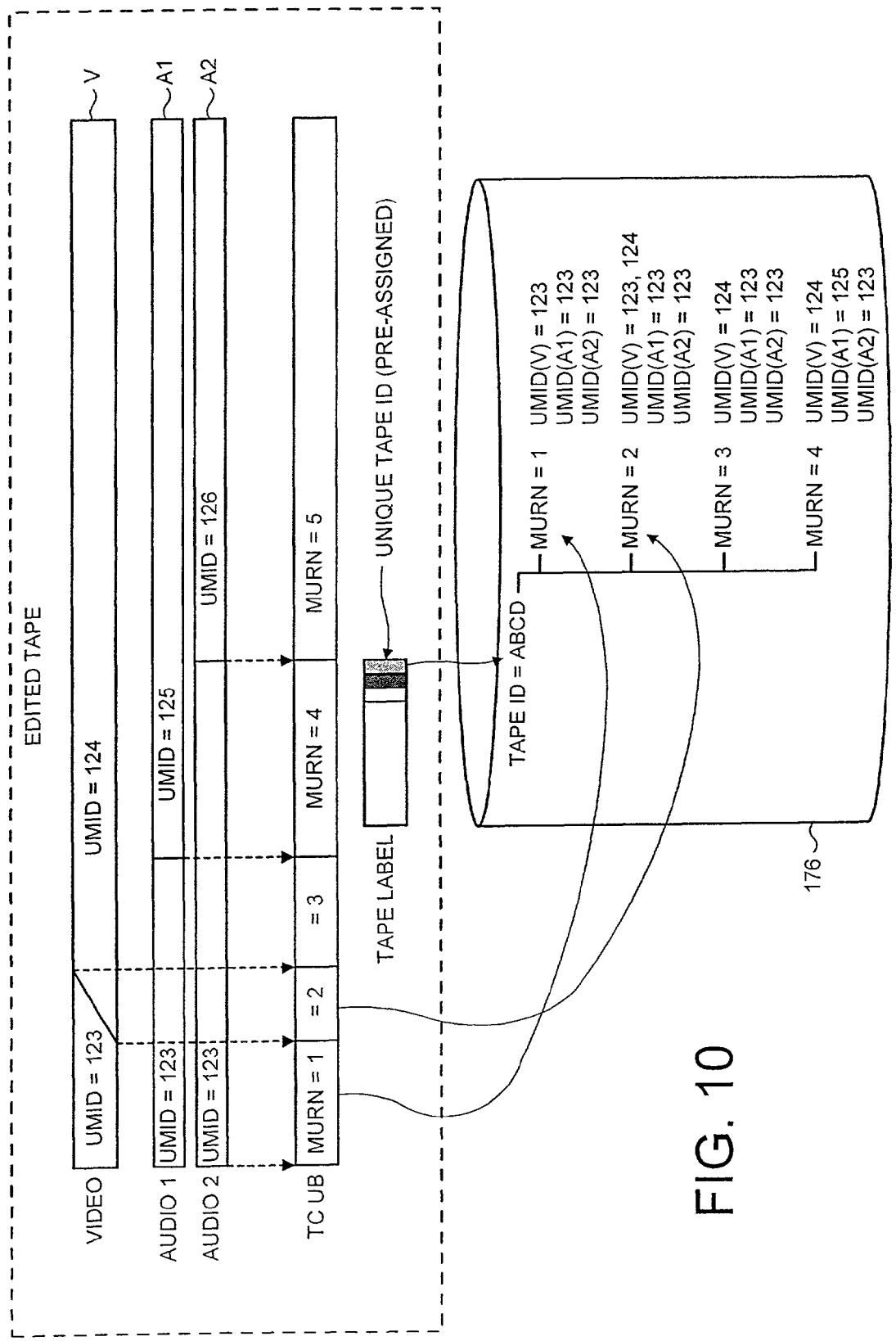

FIGS. 9 to 11 illustrate editing rules. Every tape edit event generates a new MURN. A MURN treats all tape content as a group , e.g. video plus audio1 plus audio2 plus . . . audio n. Referring to FIG. 10, a tape has 2 audio channels A1 and A2 and 1 video channel V. After editing, the video channel has a first clip (UMID 123) up to time t1, a second clip (UMID 124) from time t2 onwards and a mix of the two clips between times t1 and t2. Audio A1 has a first audio section (UMID 123 up to time t3 and a second section from time t3 onwards. Audio A2 has a first section up to time t4 and a second section from t4 onwards. Thus there are the different groups of audio and video and thus the different MURNs indicated in the database 176 in FIG. 10. The UMIDs are generated from the MURNs and Tape ID.

FIG. 11 shows an example of inserting a section of audio, e.g. a voice-over (VO) into an audio channel. The voice over is identified by UMID #0002 in the audio channel A3. Group UMIDs #01 Gp, #02 Gp identify grouped material. Thus Group UMID #02 is associated with: UMID #0001 in respect of the video channel V, and audio channels A1, A2, and A4; the IN and OUT time codes (TC) of the voice over; and the tape ID.

Figure 12:
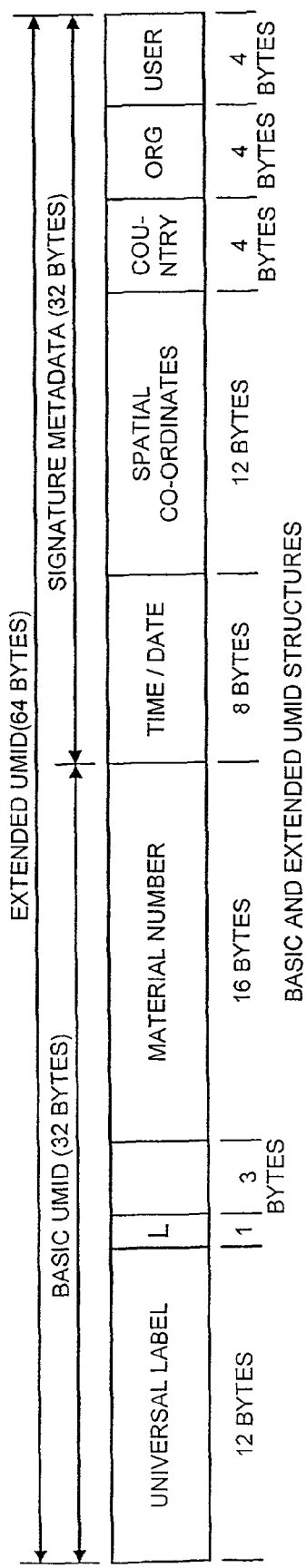
FIGS. 12 and 13 illustrate UMIDs.
Figure 13:

UMIDs—FIGS. 12 and 13

UMIDs

A UMID is described in SMPTE Journal March 2000. Referring to FIG. 12 an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed preassigned values. Byte 11 is variable. Thus referring to FIG. 13, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the Nov. 17th 1858 and allows dates to the year 4597.

The Spatial Co-ordinate Format

The spatial co-ordinate value consists of three components defined as follows:

Altitude: 8 decimal numbers specifying up to 99,999,999 meters.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

Figure 14:
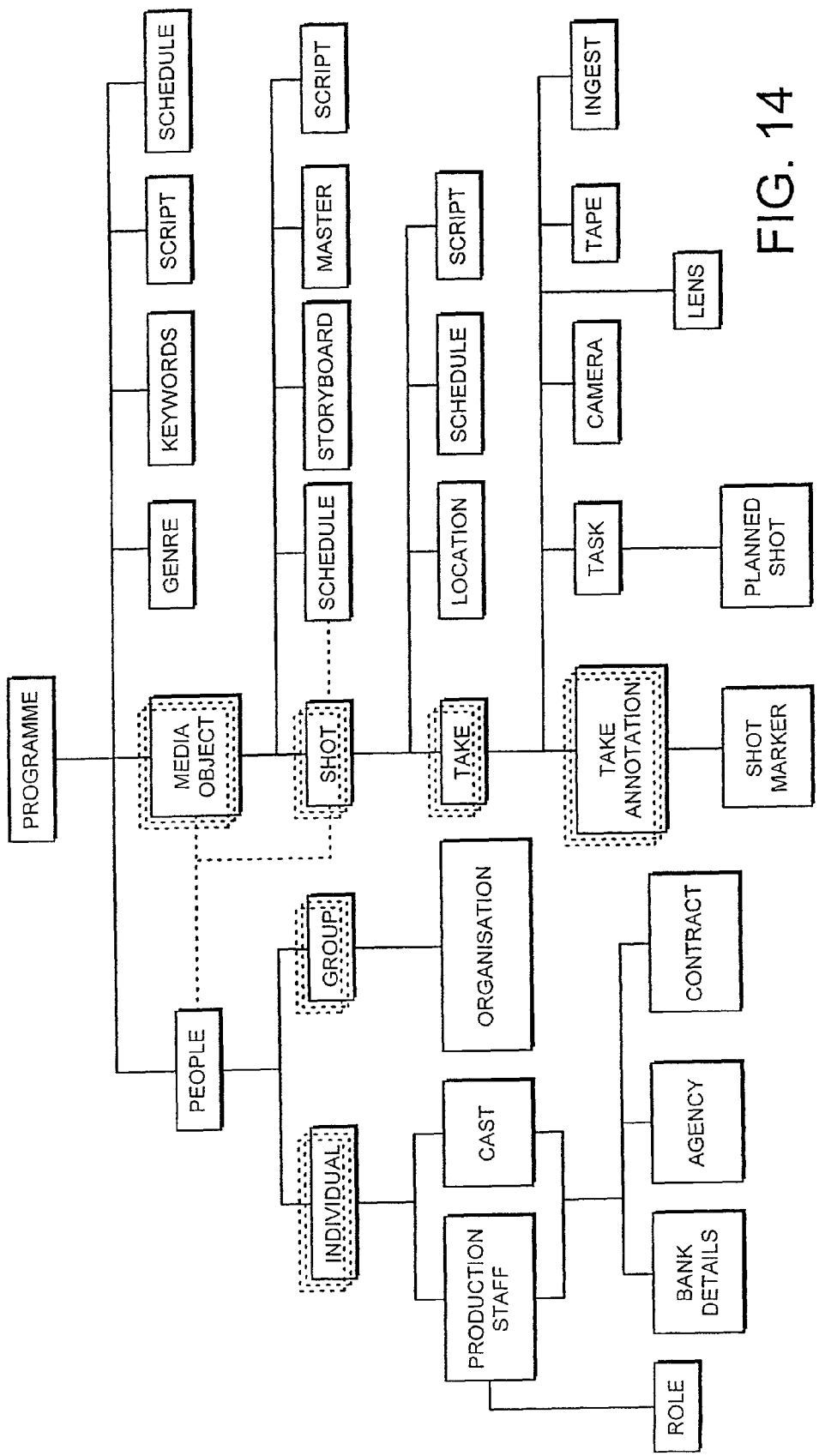
FIG. 14 illustrates a data structure for metadata in a data base.

Metadata—FIG. 14

The following is provided, by way of example, to illustrate the possible types of metadata generated during the production of a programme, and one possible organisational approach to structuring that metadata in a data base. UMIDs link the metadata in the database to the material on the tape.

FIG. 14 illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location-ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp, Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

A Box—FIGS. 15 to 21

Embodiments of the present invention relate to audio and/or video generation apparatus which may be for example television cameras, video cameras or camcorders. An embodiment of the present invention will now be described with reference to FIG. 15 which provides a schematic block diagram of a video camera which is arranged to communicate to a personal digital assistant (PDA). A PDA is an example of a data processor which may be arranged in operation to generate metadata in accordance with a user's requirements. The term personal digital assistant is known to those acquainted with the technical field of consumer electronics as a portable or hand held personal organiser or data processor which include an alpha numeric key pad and a hand writing interface.

Figure 15:
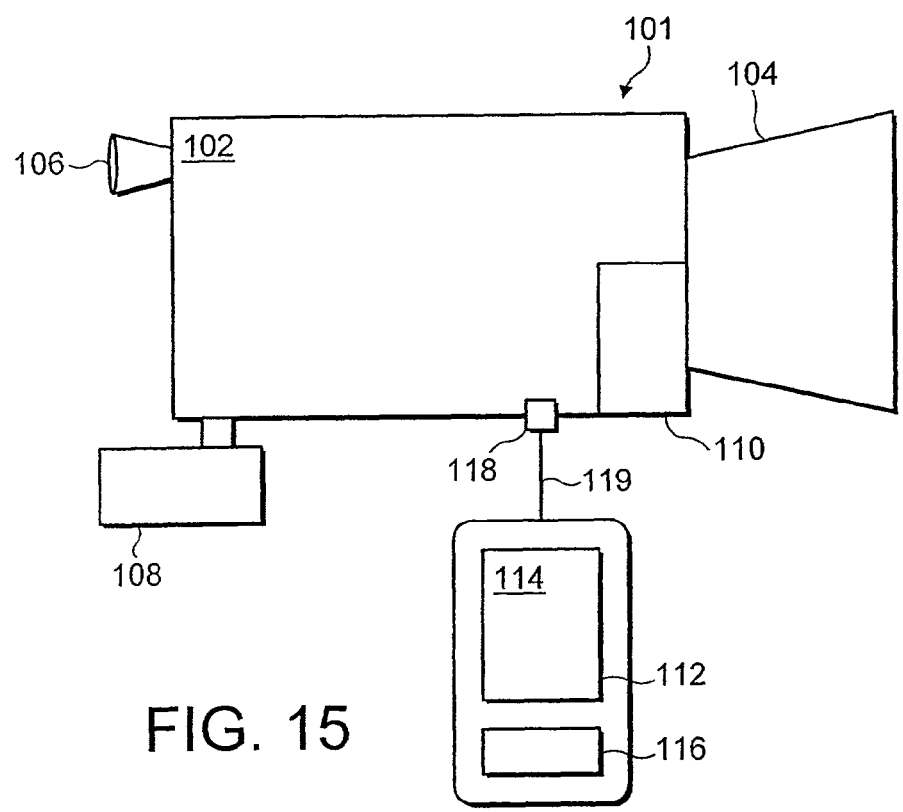
FIGS. 15 to 21 illustrate an A-Box.

In FIG. 15 a video camera 101 is shown to comprise a camera body 102 which is arranged to receive light from an image source falling within a field of view of an imaging arrangement 104 which may include one or more imaging lenses (not shown). The camera also includes a view finder 106 and an operating control unit 108 from which a user can control the recording of signals representative of the images formed within the field of view of the camera. The camera 101 also includes a microphone 110 which may be a plurality of microphones arranged to record sound in stereo. Also shown in FIG. 15 is a hand-held PDA 112 which has a screen 114 and an alphanumeric key pad 116 which also includes a portion to allow the user to write characters recognised by the PDA. The PDA 112 is arranged to be connected to the video camera 101 via an interface 118. The interface 118 is arranged in accordance with a predetermined standard format such as, for example an RS232 or the like. The interface 118 may also be effected using infra-red signals, whereby the interface 118 is a wireless communications link. The interface 118 provides a facility for communicating information with the video camera 101. The function and purpose of the PDA 112 will be explained in more detail shortly. However in general the PDA 112 provides a facility for sending and receiving metadata generated using the PDA 112 and which can be recorded with the audio and video signals detected and captured by the video camera 1. A better understanding of the operation of the video camera 101 in combination with the PDA 112 may be gathered from FIG. 16 which shows a more detailed representation of the body 102 of the video camera which is shown in FIG. 15 and in which common parts have the same numerical designations.

Figure 16:
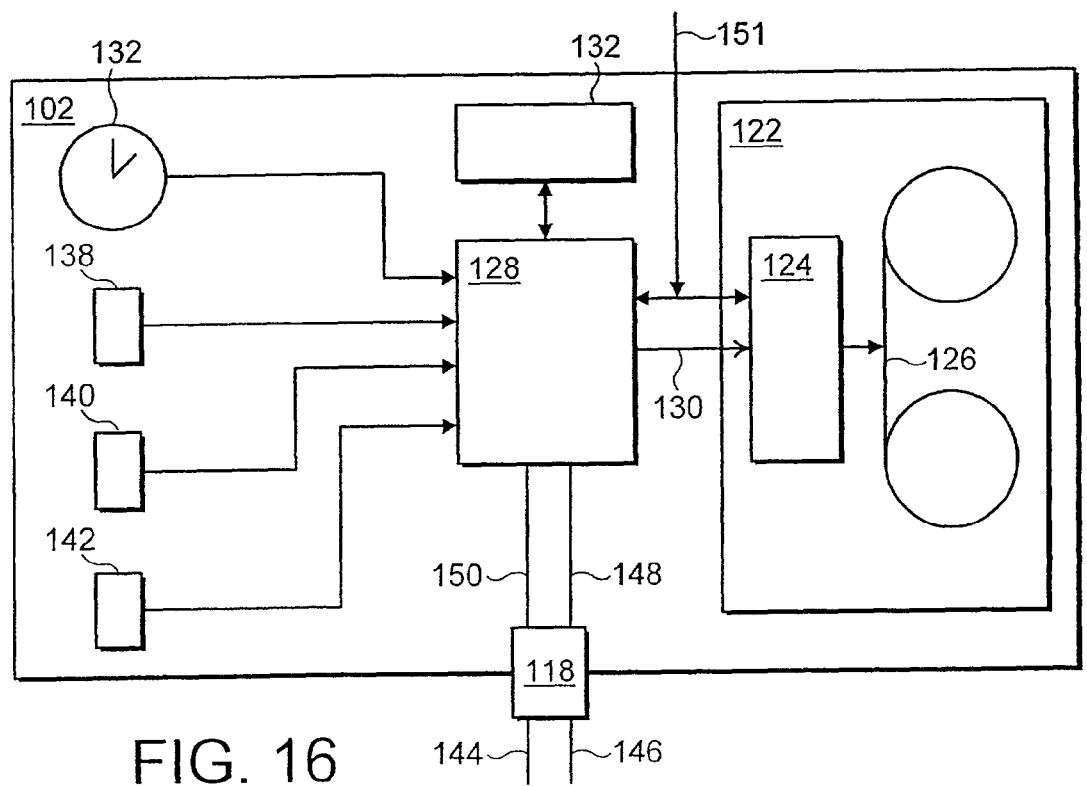

In FIG. 16 the camera body 102 is shown to comprise a tape drive 122 having read/write heads 124 operatively associated with a magnetic recording tape 126. Also shown in FIG. 16 the camera body includes a metadata generation processor 128 coupled to the tape drive 122 via a connecting channel 130. Also connected to the metadata generation processor 128 is a data store 132, a clock 136 and three sensors 138, 140, 142. The interface unit 118 sends and receives data also shown in FIG. 16 via a wireless channel 119. Correspondingly two connecting channels for receiving and transmitting data respectively, connect the interface unit 118 to the metadata generation processor 128 via corresponding connecting channels 148 and 150. The metadata generation processor is also shown to receive via a connecting channel 151 the audio/video signals generated by the camera. The audio/video signals are also fed to the tape drive 122 to be recorded on to the tape 126.

The video camera 110 shown in FIG. 15 operates to record visual information falling within the field of view of the lens arrangement 104 onto a recording medium. The visual information is converted by the camera into video signals. In combination, the visual images are recorded as video signals with accompanying sound which is detected by the microphone 101 and arranged to be recorded as audio signals on the recording medium with the video signals. As shown in FIG. 16, the recording medium is a magnetic tape 126 which is arranged to record the audio and video signals onto the recording tape 126 by the read/write heads 124. The arrangement by which the video signals and the audio signals are recorded by the read/write heads 124 onto the magnetic tape 126 is not shown in FIG. 16 and will not be further described as this does not provide any greater illustration of the example embodiment of the present invention. However once a user has captured visual images and recorded these images using the magnetic tape 126 as with the accompanying audio signals, metadata describing the content of the audio/video signals may be input using the PDA 112. As will be explained shortly this metadata can be information that identifies the audio/video signals in association with a pre-planned event, such as a 'take'. As shown in FIG. 16 the interface unit 118 provides a facility whereby the metadata added by the user using the PDA 112 may be received within the camera body 102. Data signals may be received via the wireless channel 119 at the interface unit 118. The interface unit 118 serves to convert these signals into a form in which they can be processed by the acquisition processor 128 which receives these data signals via the connecting channels 148, 150.

Metadata is generated automatically by the metadata generation processor 128 in association with the audio/video signals which are received via the connecting channel 151. In the example embodiment illustrated in FIG. 16, the metadata generation processor 128 operates to generate time codes with reference to the clock 136, and to write these time codes on to the tape 126 in a linear recording track provided for this purpose. The time codes are formed by the metadata generation processor 128 from the clock 136. Furthermore, the metadata generation processor 128 forms other metadata automatically such as a UMID, which identifies uniquely the audio/video signals. The metadata generation processor may operate in combination with the tape driver 124, to write the UMID on to the tape with the audio/video signals.

In an alternative embodiment, the UMID, as well as other metadata may be stored in the data store 132 and communicated separately from the tape 126. In this case, a tape ID is generated by the metadata generation processor 128 and written on to the tape 126, to identify the tape 126 from other tapes.

In order to generate the UMID, and other metadata identifying the contents of the audio/video signals, the metadata generation processor 128 is arranged in operation to receive signals from other sensor 138, 140, 142, as well as the clock 136. The metadata generation processor therefore operates to co-ordinate these signals and provides the metadata generation processor with metadata such as the aperture setting of the camera lens 104, the shutter speed and a signal received via the control unit 108 to indicate that the visual images captured are a "good shot". These signals and data are generated by the sensors 138, 140, 142 and received at the metadata generation processor 128. The metadata generation processor in the example embodiment is arranged to produce syntactic metadata which provides operating parameters which are used by the camera in generating the video signals. Furthermore the metadata generation processor 128 monitors the status of the camcorder 101, and in particular whether audio/video signals are being recorded by the tape drive 124. When RECORD START is detected the IN POINT time code is captured and a UMID is generated in correspondence with the IN POINT time code. Furthermore in some embodiments an extended UMID is generated, in which case the metadata generation processor is arranged to receive spatial co-ordinates which are representative of the location at which the audio/video signals are acquired. The spatial co-ordinates may be generated by a receiver which operates in accordance with the Global Positioning System (GPS). The receiver may be external to the camera, or may be embodied within the camera body 102.

When RECORD START is detected, the OUT POINT time code is captured by the metadata generation processor 128. As explained above, it is possible to generate a "good shot" marker. The "good shot" marker is generated during the recording process, and detected by the metadata generation processor. The "good shot" marker is then either stored on the tape, or within the data store 132, with the corresponding IN POINT and OUT POINT time codes.

As already indicated above, the PDA 112 is used to facilitate identification of the audio/video material generated by the camera. To this end, the PDA is arranged to associate this audio/video material with pre-planned events such as scenes, shots or takes. The camera and PDA shown in FIGS. 15 and 16 form part of an integrated system for planning, acquiring, editing an audio/video production. During a planning phase, the scenes which are required in order to produce an audio/video production are identified. Furthermore for each scene a number of shots are identified which are required in order to establish the scene. Within each shot, a number of takes may be generated and from these takes a selected number may be used to form the shot for the final edit. The planning information in this form is therefore identified at a planning stage. Data representing or identifying each of the planned scenes and shots is therefore loaded into the PDA 112 along with notes which will assist the director when the audio/video material is captured. An example of such data is shown in the table below.

| | |
|---|---|
| A/V Production | News story: BMW disposes of Rover |
| Scene ID: 900015689 | Outside Longbridge |
| Shot 5000000199 | Longbridge BMW Sign |
| Shot 5000000200 | Workers Leaving shift |
| Shot 5000000201 | Workers in car park |
| Scene ID: 900015690 | BMW HQ Munich |
| Shot 5000000202 | Press conference |
| Shot 5000000203 | Outside BMW building |
| Scene ID: 900015691 | Interview with minister |
| Shot 5000000204 | Interview |

Figure 17:
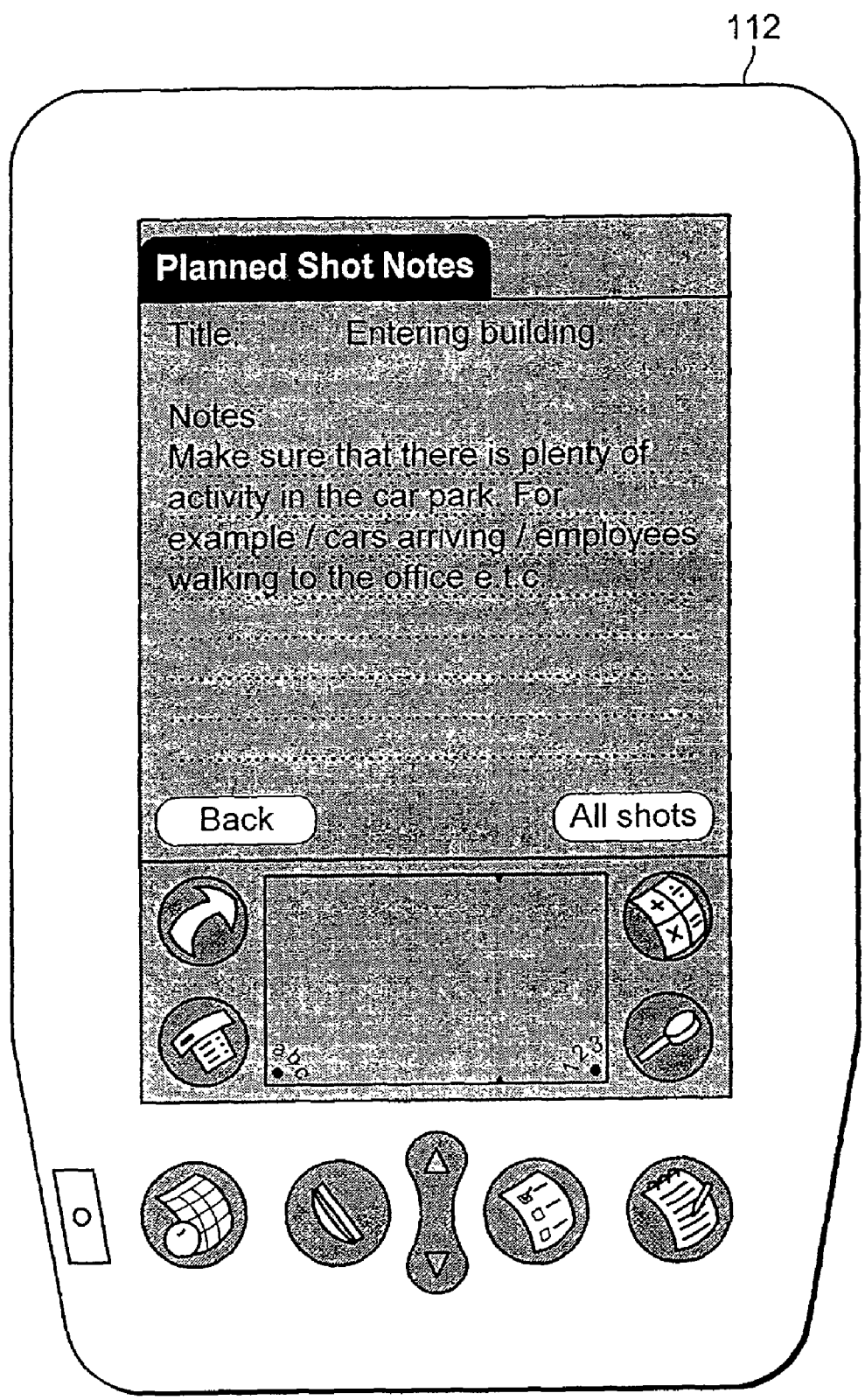
Figure 18:
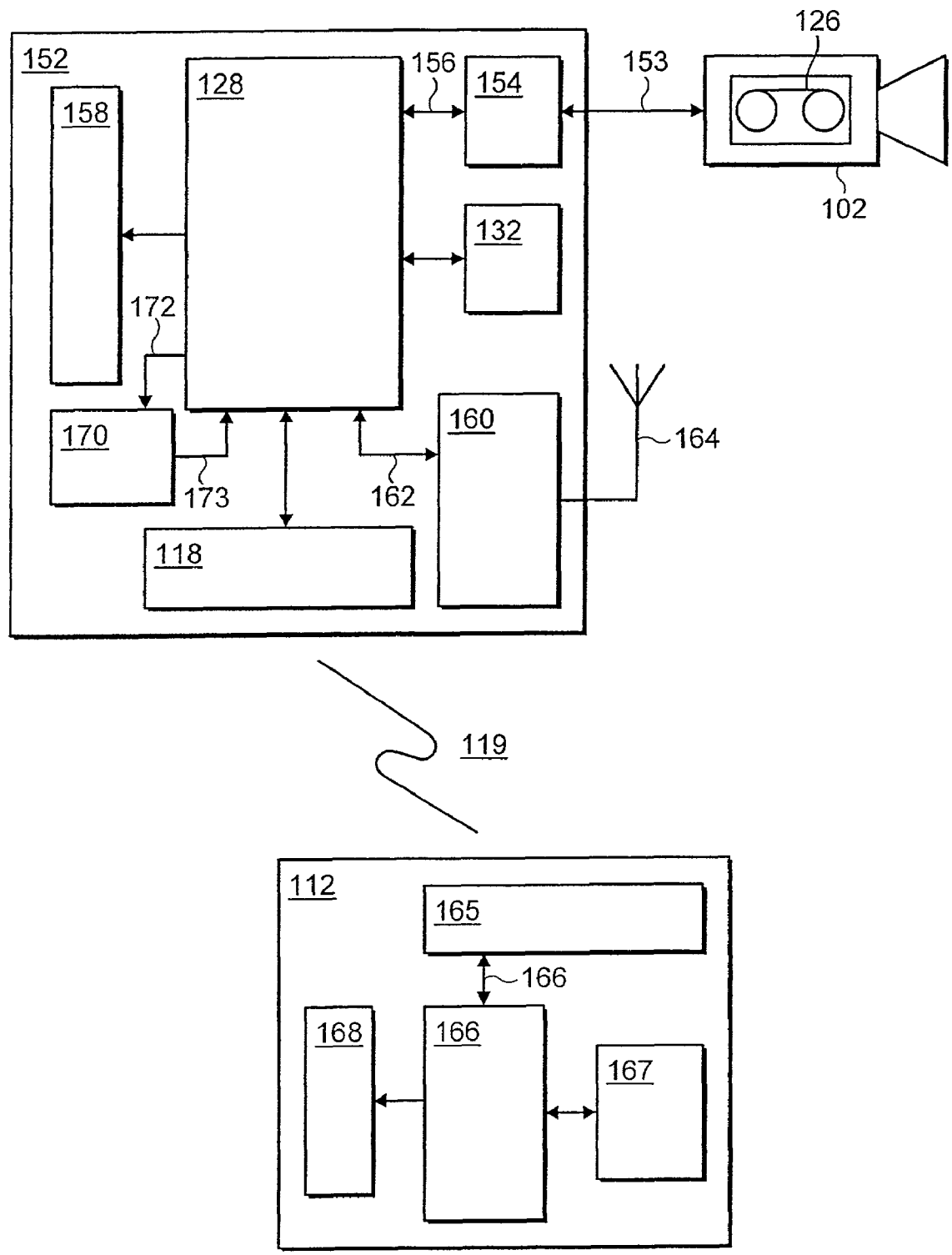

In the first column of the table below the event which will be captured by the camera and for which audio/video material will be generated is shown. Each of the events which is defined in a hierarchy is provided with an identification number. Correspondingly, in the second column notes are provided in order to direct or remind the director of the content of the planned shot or scene. For example, in the first row the audio/video production is identified as being a news story, reporting the disposal of Rover by BMW. In the extract of the planning information shown in the table below, there are three scenes, each of which is provided with a unique identification number. Each of these scenes are "Outside Long Bridge", "BMW HQ Munich" and "Interview with Minister". Correspondingly for each scene a number of shots are identified and these are shown below each of the scenes with a unique shot identification number. Notes corresponding to the content of each of these shots are also entered in the second column. So, for example, for the first scene "Outside Long Bridge", three shots are identified which are "Long Bridge BMW", "Workers leaving shift" and "Workers in car park". With this information loaded onto the PDA, the director or indeed a single camera man may take the PDA out to the place where the new story is to be shot, so that the planned audio/video material can be gathered. An illustration of the form of the PDA with the graphical user interface displaying this information is shown in FIG. 17.

As indicated in FIG. 15, the PDA 112 is arranged to communicate data to the camera 111. To this end the metadata generation processor 128 is arranged to communicate data with the PDA 112 via the interface 118. The interface 118 maybe for example an infra-red link 119 providing wireless communications in accordance with a known standard. The PDA and the parts of the camera associated with generating metadata which are shown in FIG. 16 are shown in more detail in 18.

In 18 the parts of the camera which are associated with generating metadata and communicating with the PDA 112 are shown in a separate acquisition unit 152. However it will be appreciated that the acquisition unit 152 could also be embodied within the camera 102. The acquisition unit 152 comprises the metadata generation processor 128, and the data store 132. The acquisition processor 152 also includes the clock 136 and the sensors 138, 140, 142 although for clarity these are not shown in FIG. 18. Alternatively, some or all of these features which are shown in 16 will be embodied within the camera 102 and the signals which are required to define the metadata such as the time codes and the audio/video signals themselves may be communicated via a communications link 153 which is coupled to an interface port 154. The metadata generation processor 128 is therefore provided with access to the time codes and the audio/video material as well as other parameters used in generating the audio/video material. Signals representing the time codes end parameters as well as the audio/video signals are received from the interface port 154 via the interface channel 156. The acquisition unit 152 is also provided with a screen (not shown) which is driven by a screen driver 158. Also shown in FIG. 18 the acquisition unit is provided with a communications processor 160 which is coupled to the metadata generation processor 128 via a connecting channel 162. Communications is effected by the communications processor 160 via a radio frequency communications channel using the antennae 164. A pictorial representation of the acquisition unit 152 is shown in 19.

The PDA 112 is also shown in 18. The PDA 112 is correspondingly provided with an infra-red communications port 165 for communicating data to and from the acquisition unit 152 via an infra-red link 119. A data processor 166 within the PDA 112 is arranged to communicate data to and from the infra-red port 165 via a connecting channel 166. The PDA 112 is also provided with a data store 167 and a screen driver 168 which are connected to the data processor 166.

Figure 20:
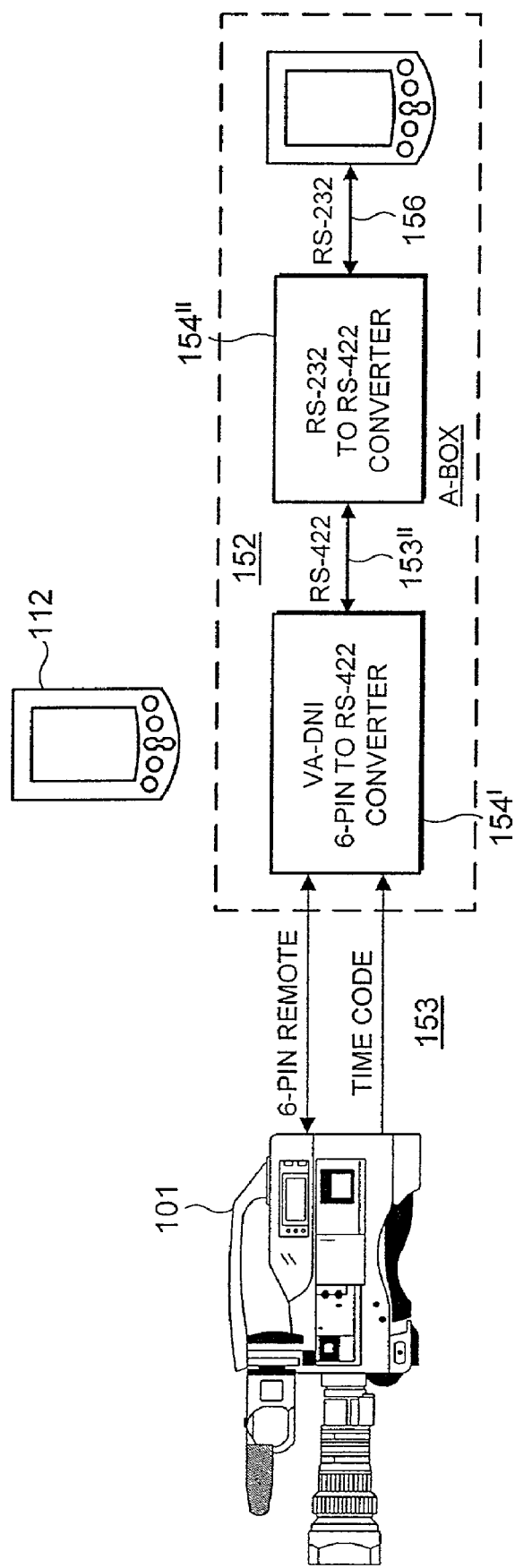

The pictorial representation of the PDA 112 shown in 17 and the acquisition unit shown in 19 provide an illustration of an example embodiment of the present invention. A schematic diagram illustrating the arrangement and connection of the PDA 112 and the acquisition unit 152 is shown in 20. In the example shown in FIG. 20 the acquisition unit 152 is mounted on the back of a camera 101 and coupled to the camera via a six pin remote connector and to a connecting channel conveying the external signal representative of the time code recorded onto the recording tape. Thus, the six pin remote connector and the time code indicated as arrow lines form the communications channel 153 shown in FIG. 18. The interface port 154 is shown in FIG. 20 to be a VA to DN1 conversion comprising an RM-P9/LTC to RS422 converter 154. RM-P9 is a camera remote control protocol, whereas LTC is Linear Time Code in the form of an analogue signal. This is arranged to communicate with a RS422 to RS232 converter 154" via a connecting channel which forms part of the interface port 154. The converter 154" then communicates with the metadata generation processor 128 via the connecting channel 156 which operates in accordance with the RS 232 standard.

Returning to FIG. 18, the PDA 112 which has been loaded with the pre-planned production information is arranged to communicate the current scene and shot for which audio/video material is to be generated by communicating the next shot ID number via the infra-red link 119. The pre-planned information may also have been communicated to the acquisition unit 152 and stored in the data store 132 via a separate link or via the infra-red communication link 119. However in effect the acquisition unit 152 is directed to generate metadata in association with the scene or shot ID number which is currently being taken. After receiving the information of the current shot the camera 102 is then operated to make a "take of the shot". The audio/video material of the take is recorded onto the recording tape 126 with corresponding time codes. These time codes are received along with the audio/video material via the interface port 154 at the metadata generation processor 128. The metadata generation processor 128 having been informed of the current pre-planned shot now being taken logs the time codes for each take of the shot. The metadata generation processor therefore logs the IN and OUT time codes of each take and stores these in the data store 132.

Figure 19:
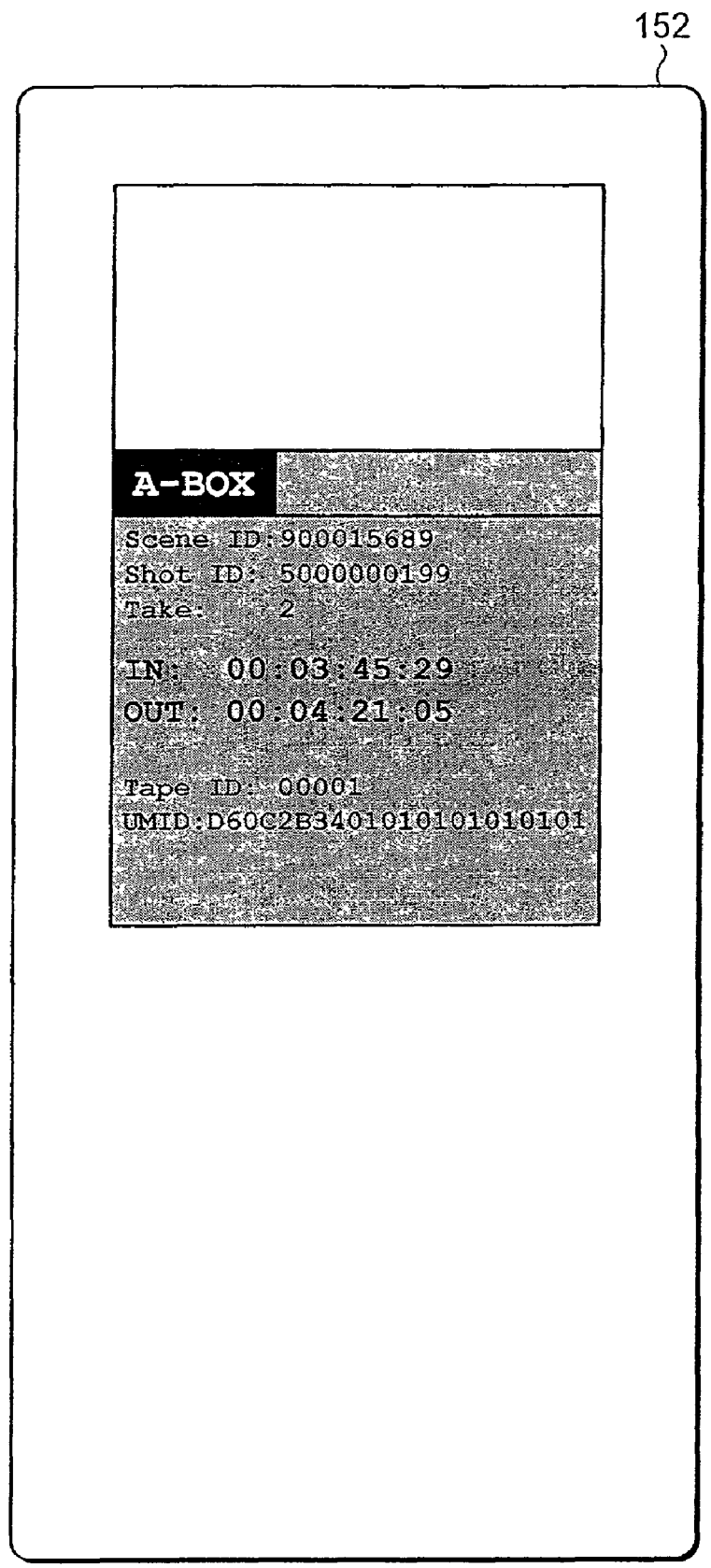

The information generated and logged by the metadata generation processor 128 is shown in the table below. In the first column the scene and shot are identified with the corresponding ID numbers, and for each shot several takes are made by the camera operator which are indicated in a hierarchical fashion. Thus, having received information from the PDA 112 of the current shot, each take made by the camera operator is logged by the metadata generation processor 128 and the IN and OUT points for this take are shown in the second and third columns and stored in the data store 132. This information may also be displayed on the screen of the acquisition unit 152 as shown in FIG. 19. Furthermore, the metadata generation processor 128 as already explained generates the UMID for each take for the audio/video material generated during the take. The UMID for each take forms the fourth column of the table. Additionally, in some embodiments, to provide a unique identification of the tape once which the material is recorded, a tape identification is generated and associated with the metadata. The tape identification may be written on to the tape, or stored on a random access memory chip which is embodied within the video tape cassette body. This random access memory chip is known as a TELEFILE (RTM) system which provides a facility for reading the tape ID number remotely. The tape ID is written onto the magnetic tape 126 to uniquely identify this tape. In preferred embodiments the TELEFILE (RTM) system is provided with a unique number which manufactured as part of the memory and so can be used as the tape ID number. In other embodiments the TELEFILE (RTM) system provides automatically the IN/OUT time codes of the recorded audio/video material items.

In one embodiment the information shown in the table below is arranged to be recorded onto the magnetic tape in a separate recording channel. However, in other embodiments the metadata shown in the table is communicated separately from the tape 126 using either the communications processor 160 or the infra-red link 119. The metadata maybe received by the PDA 112 for analysis and may be further communicated by the PDA.

| Scene ID: 900015689 | Tape ID: 00001 | | UMID: |
|---|---|---|---|
| Shot 5000000199 | | | |
| Take 1 | IN: 00:03:45:29 | OUT: 00:04:21:05 | 060C23B340.. |
| Take 2 | IN: 00:04:21:20 | OUT: 00:04:28:15 | 060C23B340.. |
| Take 3 | IN: 00:04:28:20 | OUT: 00:05:44:05 | 060C23B340.. |
| Shot 5000000200 | | | |
| Take 1 | IN: 00:05:44:10 | OUT: 00:08:22:05 | 060C23B340.. |
| Take 2 | IN: 00:08:22:10 | OUT: 00:08:23:05 | 060C23B340.. |

The communications processor 160 may be arranged in operation to transmit the metadata generated by the metadata generation processor 128 via a wireless communications link. The metadata maybe received via the wireless communications link by a remotely located studio which can then acquire the metadata and process this metadata ahead of the audio/video material recorded onto the magnetic tape 126. This provides an advantage in improving the rate at which the audio/video production may be generated during the post production phase in which the material is edited.

A further advantageous feature provided by embodiments of the present invention is an arrangement in which a picture stamp is generated at certain temporal positions within the recorded audio/video signals. A picture stamp is known to those skilled in the art as being a digital representation of an image and in the present example embodiment is generated from the moving video material generated by the camera. The picture stamp may be of lower quality in order to reduce an amount of data required to represent the image from the video signals. Therefore the picture stamp may be compression encoded which may result in a reduction in quality. However a picture stamp provides a visual indication of the content of the audio/video material and therefore is a valuable item of metadata. Thus, the picture stamp may for example be generated at the IN and OUT time codes of a particular take. Thus, the picture stamps may be associated with the metadata generated by the metadata generation processor 128 and stored in the data store 132. The picture stamps are therefore associated with items of metadata such as, for example, the time codes which identify the place on the tape where the image represented by the picture stamp is recorded. The picture stamps may be generated with the "Good Shot" markers. The picture stamps are generated by the metadata generation processor 128 from the audio/video signals received via the communications link 153. The metadata generation processor therefore operates to effect a data sampling and compression encoding process in order to produce the picture stamps. Once the picture stamps have been generated they can be used for several purposes. They may be stored in a data file and communicated separately from the tape 126, or they may be stored on the tape 126 in compressed form in a separate recording channel. Alternatively in preferred embodiments picture stamps may be communicated using the communications processor 160 to the remotely located studio where a producer may analysis the picture stamps. This provides the producer with an indication as to whether the audio/video material generated by the camera operator is in accordance with what is required.

In a yet further embodiment, the picture stamps are communicated to the PDA 112 and displayed on the PDA screen. This may be effected via the infra-red port 119 or the PDA may be provided with a further wireless link which can communicate with the communications processor 160. In this way a director having the hand held PDA 112 is provided with an indication of the current audio/video content generated by the camera. This provides an immediate indication of the artist and aesthetic quality of the audio/video material currently being generated. As already explained the picture stamps are compression encoded so that they may be rapidly communicated to the PDA.

A further advantage of the acquisition unit 152 shown in FIG. 19 is that the editing process is made more efficient by providing the editor at a remotely located studio with an indication of the content of the audio/video material in advance of receiving that material. This is because the picture stamps are communication with the metadata via a wireless link so that the editor is provided with an indication of the content of the audio/video material in advance of receiving the audio/video material itself. In this way the bandwidth of the audio/video material can remain high with a correspondingly high quality whilst the metadata and picture stamps are at a relatively low band width providing relatively low quality information. As a result of the low band width the metadata and picture stamps may be communicated via a wireless link on a considerably lower band width channel. This facilitates rapid communication of the metadata describing content of the audio/video material.

The picture stamps generated by the metadata generation processor 128 can be at any point during the recorded audio/ video material. In one embodiment the picture stamps are generated at the IN and OUT points of each take. However in other embodiments of the present invention as an activity processor 170 is arranged to detect relative activity within the video material. This is effected by performing a process in which a histogram of the colour components of the images represented by the video signal is compiled and the rate of change of the colour components determined and changes in these colour components used to indicate activity within the image. Alternatively or in addition, motion vectors within the image are used to indicate activity. The activity processor 176 then operates to generate a signal indicative of the relative activity within the video material. The metadata generation processor 128 then operates in response to the activity signal to generate picture stamps such more picture stamps are generated for greater activity within the images represented by the video signals.

In an alternative embodiment of the present invention the activity processor 170 is arranged to receive the audio signals via the connecting channel 172 and to recognise speech within the audio signals. The activity processor 170 then generates content data representative of the content of this speech as text. The text data is then communicated to the data processor 128 which may be stored in the data store 132 or communicated with other metadata via the communications processor 160 in a similar way to that already explained for the picture stamps.

Figure 21:
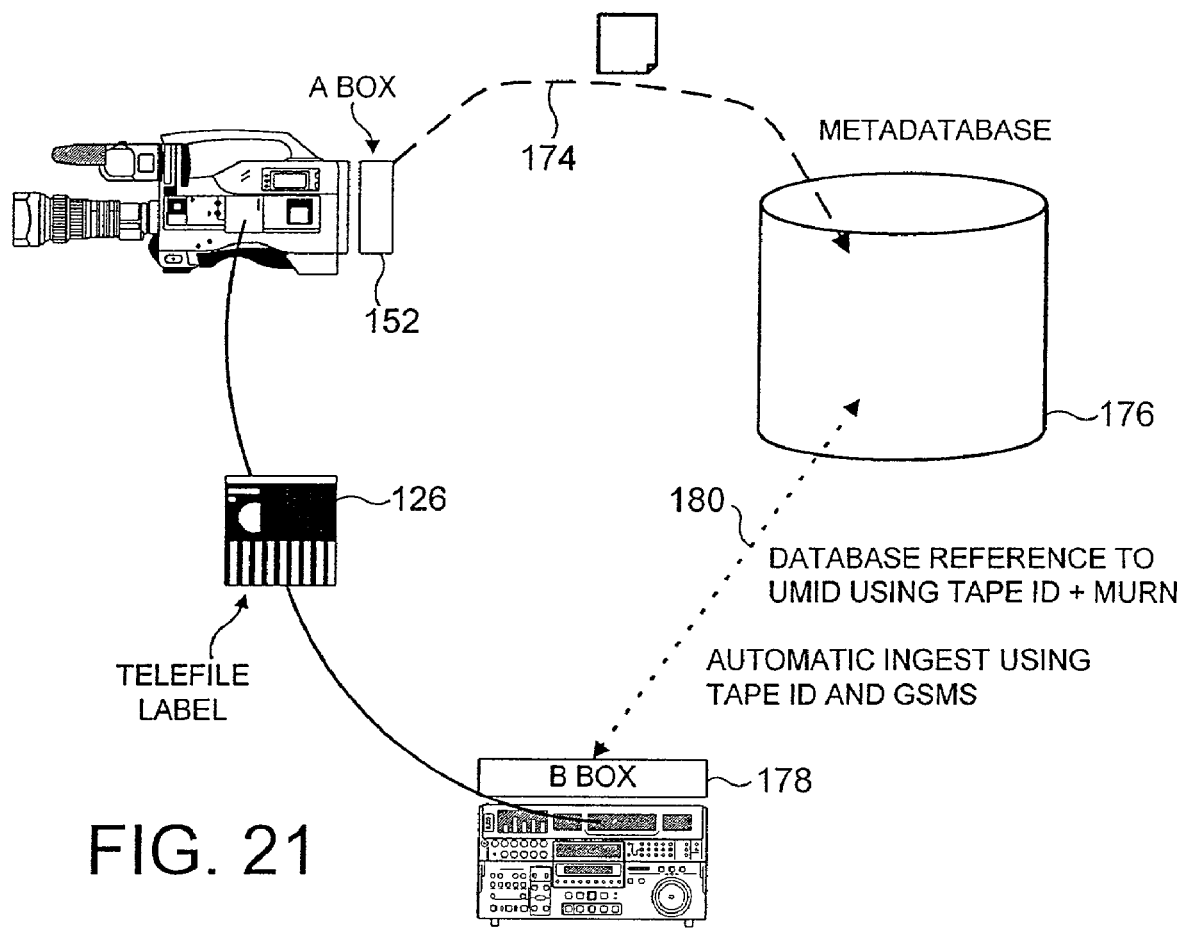

FIG. 21 provides a schematic representation of a post production process in which the audio/video material is edited to produce an audio/video program. As shown in FIG. 21 the metadata, which may include picture stamps and/or the speech content information is communicated from the acquisition unit 152 via a separate route represented by a broken line 174, to a metadata database 176. The route 174 may be representative of a wireless communications link formed by for example UMTS, GSM or the like.

The database 176 stores metadata to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other metadata providing an indication of the content of the audio/video material is used to associate the metadata stored in the data store 176 with the audio/video material on the tape as indicated by the broken line 180.

As will be appreciated although the example embodiment of the present invention uses a video tape as the recording medium for storing the audio/video signals, it will be understood that alternative recording medium such as magnetic disks and random access memories may also be used.

B Box—FIGS. 22 to 27

Figure 22:
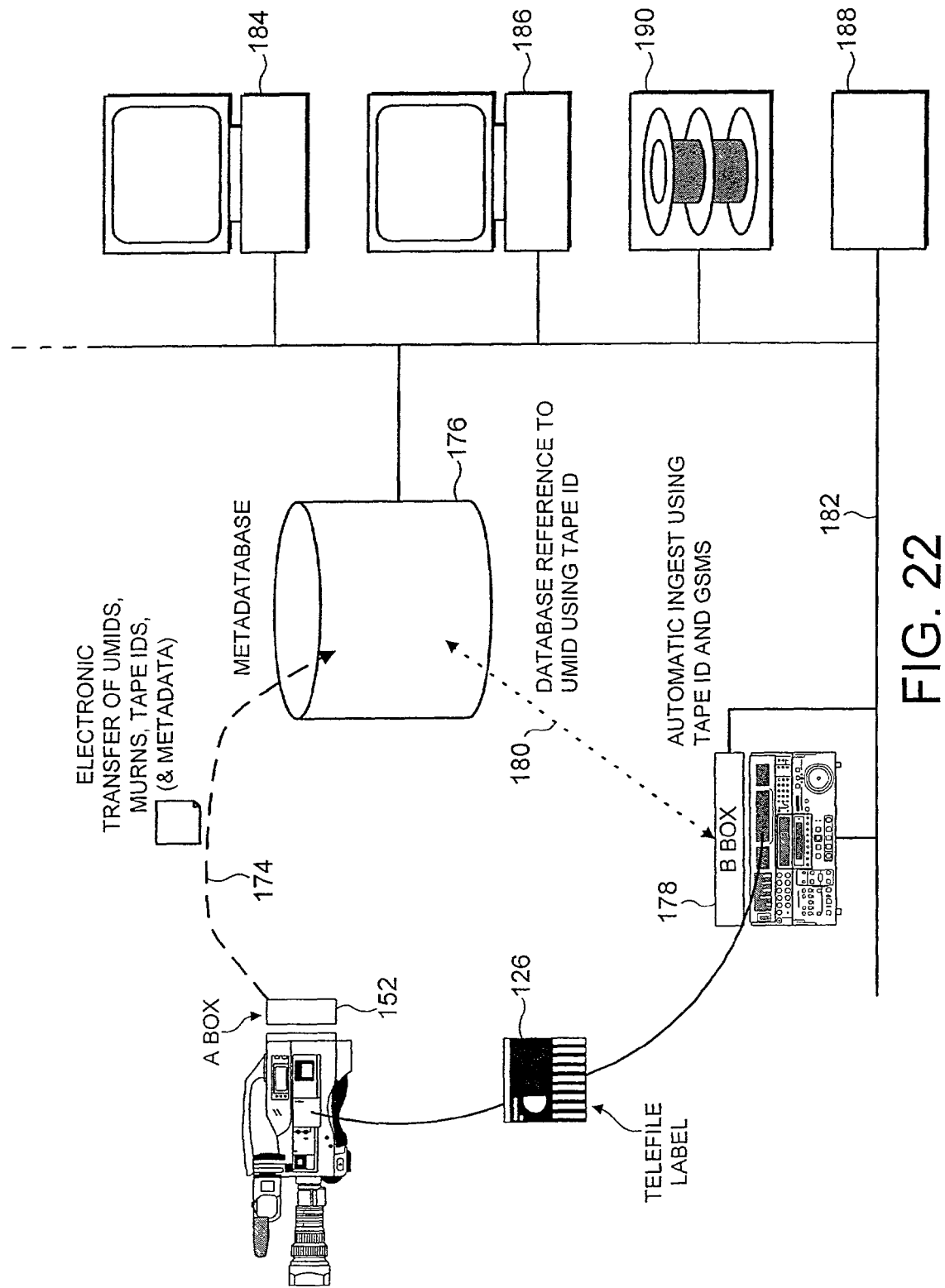
FIGS. 22 to 27 illustrate a B-Box.

FIG. 22 provides a schematic representation of a post production process in which the audio/video material is edited to produce an audio/video program. As shown in FIG. 7 the metadata, which may include picture stamps and/or the speech content information is communicated from the acquisition unit 152 via a separate route represented by a broken line 174, to a metadata database 176. The route 174 may be representative of a wireless communications link formed by for example UMTS, GSM or the like.

The database 176 stores metadata to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other metadata providing an indication of the content of the audio/video material is used to associate the metadata stored in the data store 176 with the audio/video material on the tape as indicated by the broken line 180.

The ingestion processor 178 is also shown in 22 to be connected to a network formed from a communications channel represented by a connecting line 182. The connecting line 182 represents a communications channel for communicating data to items of equipment, which form an inter-connected network. To this end, these items of equipment are provided with a network card which may operate in accordance with a known access technique such as Ethernet, RS422 and the like. Furthermore, as will be explained shortly, the communications network 182 may also provide data communications in accordance with the Serial Digital Interface (SDI) or the Serial Digital Transport Interface (SDTI).

Also shown connected to the communications network 182 is the metadata database 176, and an audio/video server 190, into which the audio/video material is ingested. Furthermore, editing terminals 184, 186 are also connected to the communications channel 182 along with a digital multi-effects processor 188.

The communications network 182 provides access to the audio/video material present on tapes, discs or other recording media which are loaded into the ingestion processor 178.

The metadata database 176 is arranged to receive metadata via the route 174 describing the content of the audio/video material recorded on to the recording media loaded into the ingestion processor 178.

As will be appreciated although in the example embodiment a video tape has been used as the recording medium for storing the audio/video signals, it will be understood that alternative recording media such as magnetic disks and random access memories may also be used, and that video tape is provided as an illustrative example only.

The editing terminals 184, 186 digital multi-effects processor 188 are provided with access to the audio/video material recorded on to the tapes loaded into the ingestion processor 178 and the metadata describing this audio/video material stored in the metadata database 176 via the communications network 182. The operation of the ingestion processor with 178 in combination with the metadata database 176 will now be described in more detail.

Figure 23:
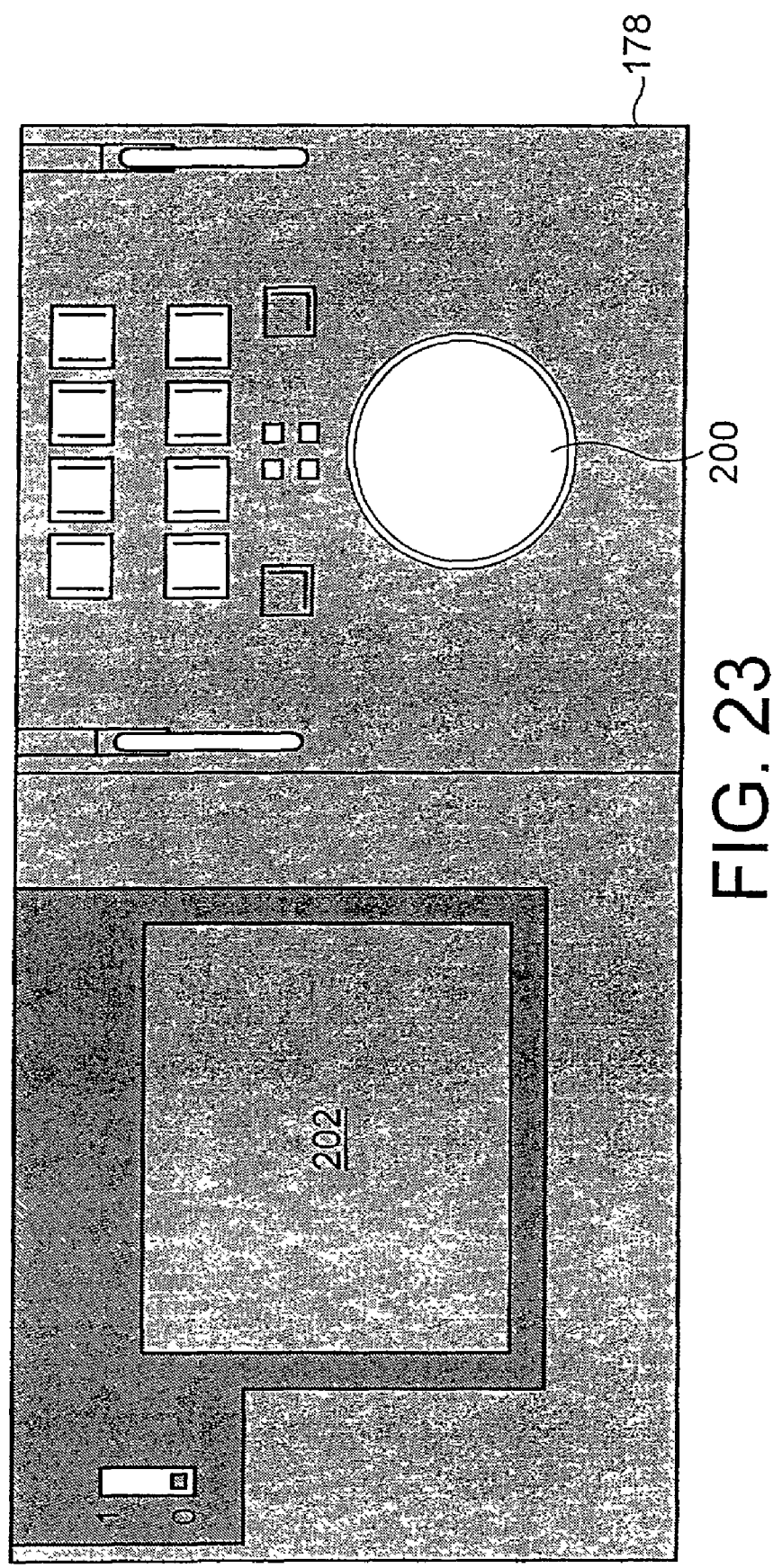

FIG. 23 provides an example representation of the ingestion processor 178. In FIG. 23 the ingestion processor 178 is shown to have a jog shuttle control 200 for navigating through the audio/video material recorded on the tapes loaded into video tape recorders/reproducers forming part of the ingestion processor 178. The ingestion processor 178 also includes a display screen 202 which is arranged to display picture stamps which describe selected parts of the audio/video material. The display screen 202 also acts as a touch screen providing a user with the facility for selecting the audio/video material by touch. The ingestion processor 178 is also arranged to display all types of metadata on the screen 202 which includes script, camera type, lens types and UMIDs.

Figure 24:
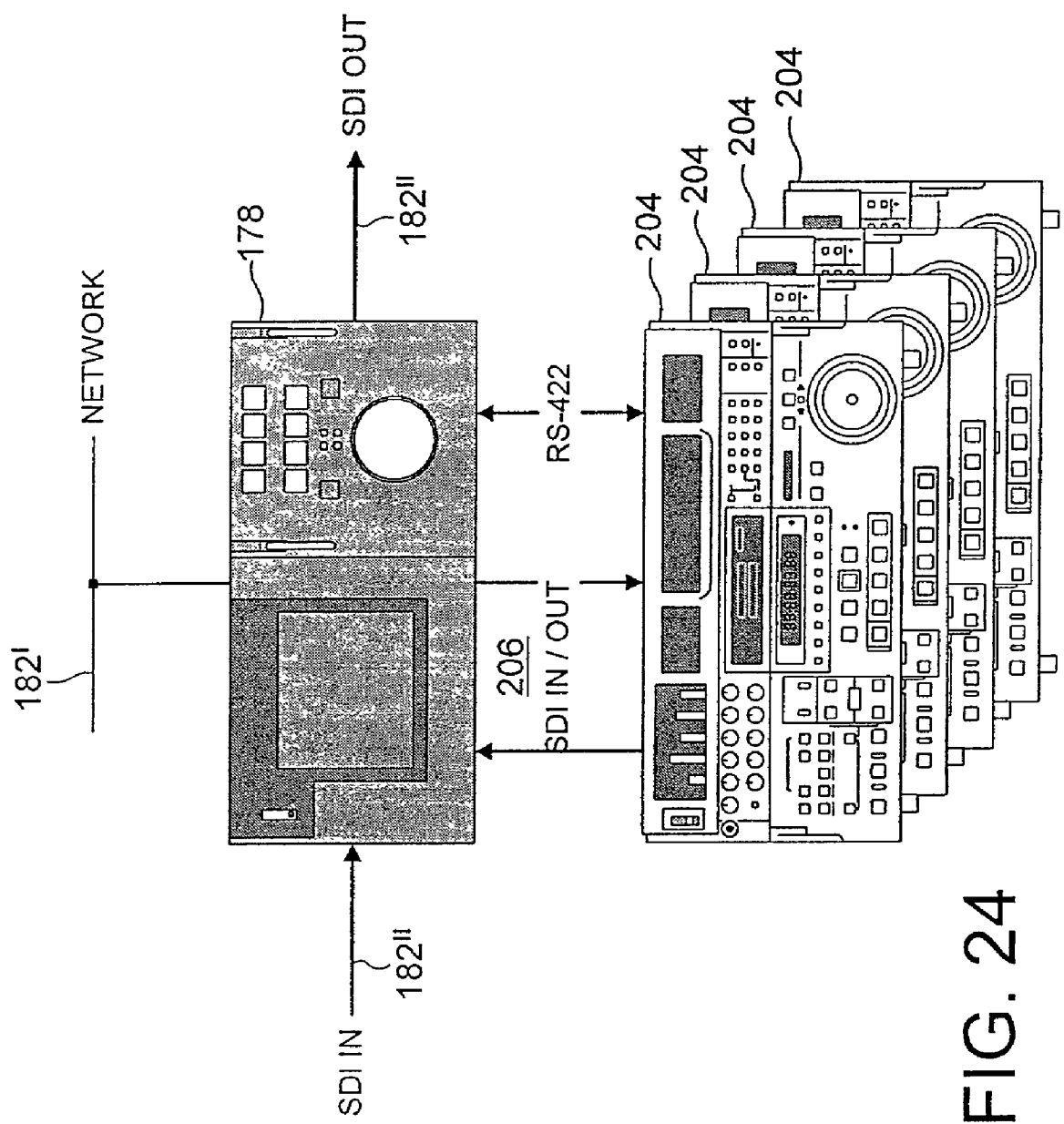

As shown in FIG. 24, the ingestion processor 178 may include a plurality of video tape recorders/reproducers into which the video tapes onto which the audio/video material is recorded may be loaded in parallel. In the example shown in FIG. 24, the video tape recorders 204 are connected to the ingestion processor 178 via an RS422 link and an SDI IN/OUT link. The ingestion processor 178 therefore represents a data processor which can access any of the video tape recorders 204 in order to reproduce the audio/video material from the video tapes loaded into the video tape recorders. Furthermore, the ingestion processor 178 is provided with a network card in order to access the communications network 182. As will be appreciated from FIG. 249 however, the communications channel 182 is comprised of a relatively low band width data communications channel 182' and a high band width SDI channel 182" for use in streaming video data. Correspondingly, therefore the ingestion processor 178 is connected to the video tape recorders 204 via an RS422 link in order communicate requests for corresponding items of audio/video material. Having requested these items of audio/video material, the audio/video material is communicated back to the ingestion processor 178 via an SDI communication link 206 for distribution via the SDI network. The requests may for example include the UMID which uniquely identifies the audio/video material item(s).

Figure 25:
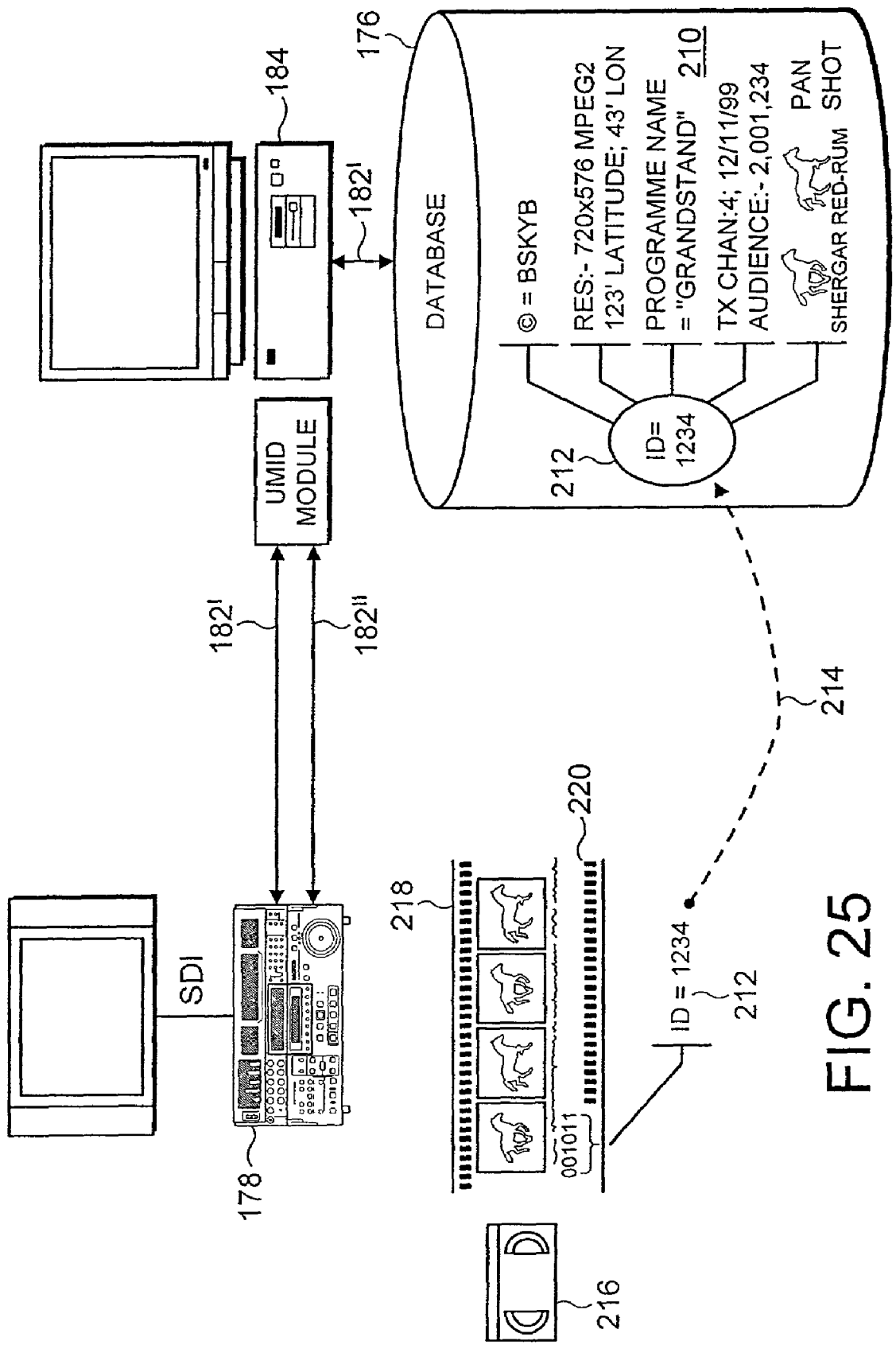

The operation of the ingestion processor in association with the metadata database 176 will now be explained with reference to FIG. 25. In FIG. 25 the metadata database 176 is shown to include a number of items of metadata 210 associated with a particular tape ID 212. As shown by the broken line headed arrow 214, the tape ID 212 identifies a particular video tape 216, on which the audio/video material corresponding to the metadata 210 is recorded. In the example embodiment shown in FIG. 25 the tape ID 212 is written onto the video tape 218 in the linear time code area 220. However it will be appreciated that in other embodiments, the tape ID could be written in other places such as the vertical blanking portion. The video tape 216 is loaded into one of the video tape recorders 204 forming part of the ingestion processor 178.

In operation one of the editing terminals 184 is arranged to access the metadata database 176 via the low band width communications channel 182' the editing terminal 184 is therefore provided with access to the metadata 210 describing the content of the audio/video material recorded onto the tape 216. The metadata 210 may include such as the copyright owner "BSkyB", the resolution of the picture and the format in which the video material is encoded, the name of the program, which is in this case "Grandstand", and information such as the date, time and audience. Metadata may further include a note of the content of the audio/video material.

Each of the items of audio/video material is associated with a UMID, which identifies the audio/video material. As such, the editing terminal 184 can be used to identify and select from the metadata 210 the items of audio/video material which are required in order to produce a program. This material may be identified by the UMID associated with the material. In order to access the audio/video material to produce the program, the editing terminal 184 communicates a request for this material via the low band width communications network 182. The request includes the UMID or the UMIDs identifying the audio/video material item(s). In response to the request for audio/video material received from the editing terminal 184, the ingestion processor 178 is arranged to reproduce selectively these audio/video material items identified by the UMID or UMIDs from the video tape recorder into which the video cassette 216 is loaded. This audio/video material is then streamed via the SDI network 182" back to the editing terminal 184 to be incorporated into the audio/video production being edited. The streamed audio/video material is ingested into the audio/video server 190 from where the audio/video can be stored and reproduced.

Figure 26:
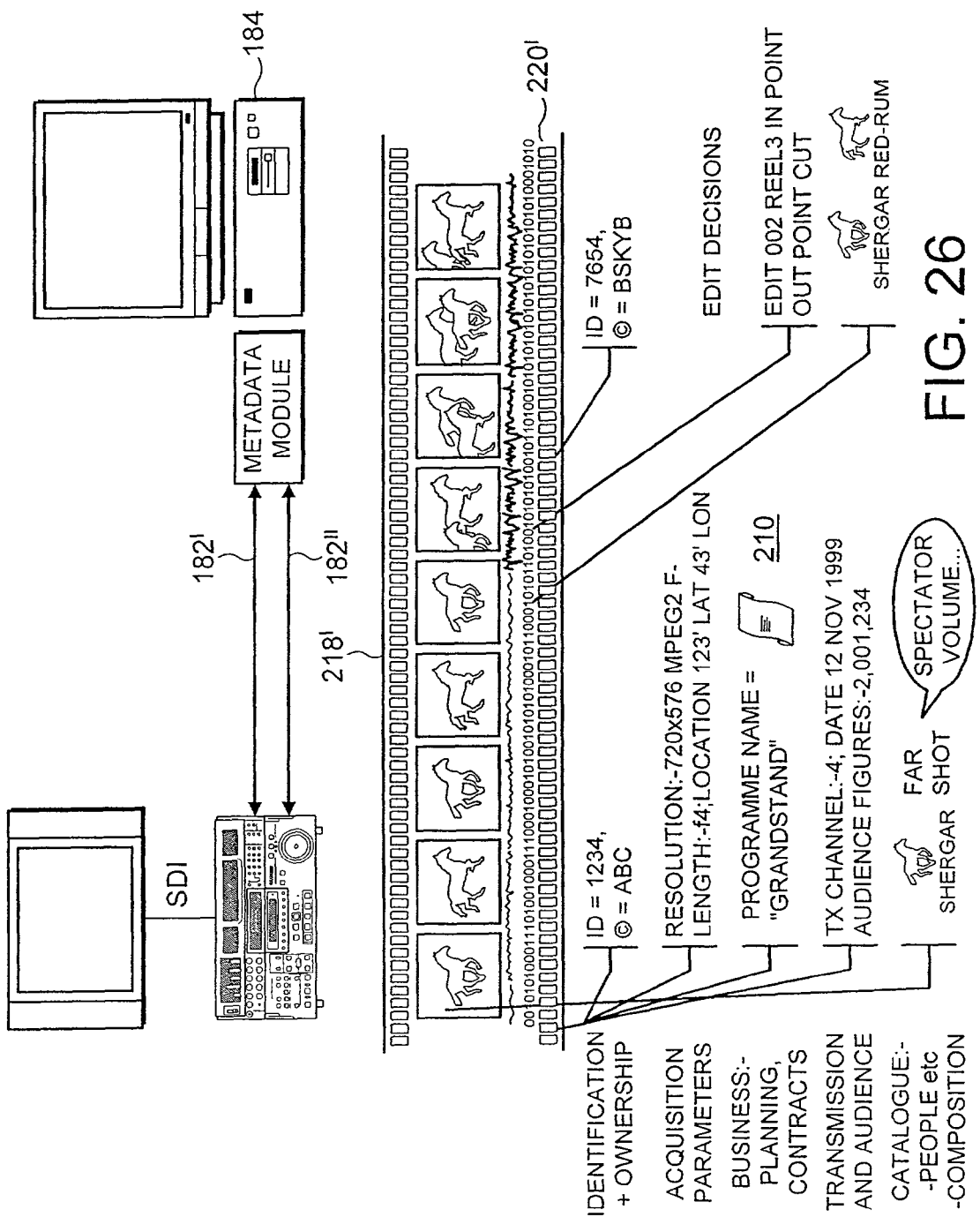

FIG. 26 provides an alternative arrangement in which the metadata 210 is recorded onto a suitable recording medium with the audio/video material. For example the metadata 210 could be recorded in one of the audio tracks of the video tape 218'. Alternatively, the recording medium may be an optical disc or magnetic disc allowing random access and providing a greater capacity for storing data. In this case the metadata 210 may be stored with the audio/video material.

In a yet further arrangement, some or all of the metadata may be recorded onto the tape 216. This may be recorded, for example, into the linear recording track of the tape 218. Some metadata related to the metadata recorded onto the tape may be conveyed separately and stored in the database 176. A further step is required in order to ingest the metadata and to this end the ingestion processor 178 is arranged to read the metadata from the recording medium 218' and convey the metadata via the communications network 182' to the metadata database 176. Therefore, it will be appreciated that the metadata associated with the audio/video material to be ingested by the ingestion processor 178 may be ingested into the database 176 via a separate medium or via the recording medium on which the audio/video material is also recorded.

The metadata associated with the audio/video material may also include picture stamps which represent low quality representations of the images at various points throughout the video material. These may be presented at the touch screen 202 on the ingestion processor 178. Furthermore these picture stamps may be conveyed via the network 182' to the editing terminals 184, 186 or the effects processor 188 to provide an indication of the content of the audio/video material. The editor is therefore provided with a pictorial representation for the audio/video material and from this a selection of an audio/video material items may be made. Furthermore, the picture stamp may stored in the database 176 as part of the metadata 210. The editor may therefore retreive a selected item for the corresponding picture stamp using the UMID which is associated with the picture stamp.

In other embodiments of the invention, the recording medium may not have sufficient capacity to include picture stamps recorded with the audio/video material. This is likely to be so if the recording medium is a video tape 216. It is particularly appropriate in this case, although not exclusively so, to generate picture stamps before or during ingestion of the audio/video material.

Figure 27A:
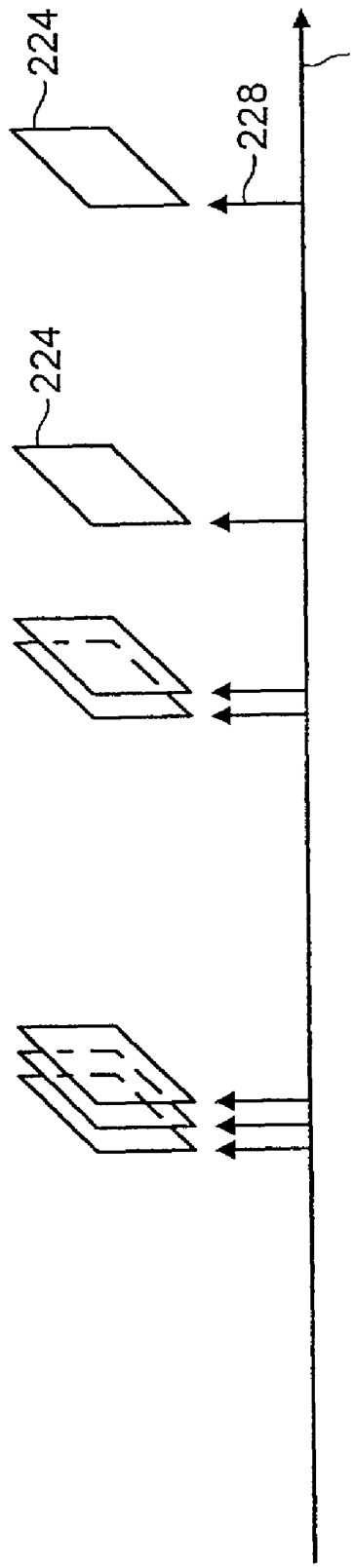

Returning to FIG. 22, in other embodiments, the ingestion processor 178 may include a pre-processing unit. The pre-processing unit embodied within the ingestion processor 178 is arranged to receive the audio/video material recorded onto the recording medium which, in the present example is a video tape 126. To this end, the pre-processing unit may be provided with a separate video recorder/reproducer or may be combined with the video tape recorder/reproducer which forms part of the ingestion processor 178. The pre-processing unit generates picture stamps associated with the audio/video material. As explained above, the picture stamps are used to provide a pictorial representation of the content of the audio/video material items. However in accordance with a further embodiment of the present invention the pre-processing unit operates to process the audio/video material and generate an activity indicator representative of relative activity within the content of the audio/video material. This may be achieved for example using a processor which operates to generate an activity signal in accordance with a histogram of colour components within the images represented by the video signal and to generate the activity signals in accordance with a rate of change of the colour histogram components. The pre-processing unit then operates to generate a picture stamp at points throughout the video material where there are periods of activity indicated by the activity signal. This is represented in FIG. 27. In FIG. 27A picture stamps 224 are shown to be generated along a line 226 which is representing time within the video signal. As shown in FIG. 27A the picture stamps 224 are generated at times along the time line 226 where the activity signal represented as arrows 228 indicates events of activity. This might be for example someone walking into and out of the field of view of the camera where there is a great deal of motion represented by the video signal. To this end, the activity signal may also be generated using motion vectors which may be, for example, the motion vectors generated in accordance with the MPEG standard.

In other embodiments of the invention, the pre-processor may generate textual information corresponding to speech present within the audio signal forming part of the audio/video material items stored on the tape 126. The textual information may be generated instead of the picture stamps or in addition to the picture stamps. In this case, text may be generated for example for the first words of sentences and/or the first activity of a speaker. This is detected from the audio signals present on the tape recording or forming part of the audio/video material. The start points where text is to be generated is represented along the time line 226 as arrows 230. Alternatively the text could be generated at the end of sentences or indeed at other points of interest within the speech.

Figure 27B:
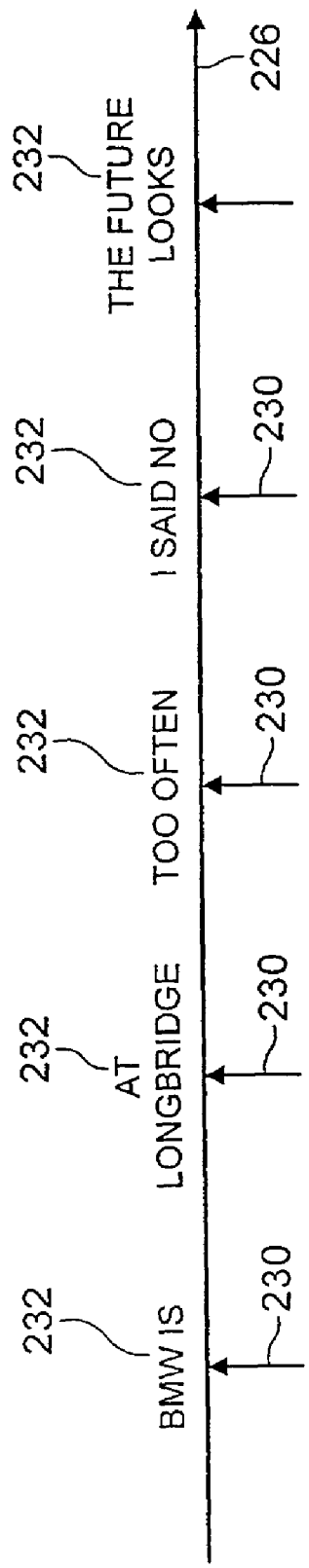

At the detected start of the speech, a speech processor operates to generate a textual representation of the content of the speech. To this end, the time line 226 shown in FIG. 27B is shown to include the text 232 corresponding to the content of the speech at the start of activity periods of speech.

The picture stamps and textual representation of the speech activity generated by the pre-processor is communicated via the communications channel 182 to the metadata database 176 and stored. The picture stamps and text are stored in association with the UMID identifying the corresponding items of audio/video material from which the picture stamps 224 and the textual information 232 were generated. This therefore provides a facility to an editor operating one of the editing terminals 184, 186 to analyse the content of the audio/video material before it is ingested using the ingestion processor 178. As such the video tape 126 is loaded into the ingestion processor 178 and thereafter the audio/video material can be accessed via the network communications channel 182. The editor is therefore provided with an indication, very rapidly, of the content of the audio/video material and so may ingest only those parts of the material, which are relevant to the particular material items required by the editor. This has a particular advantage in improving the efficiency with which the editor may produce an audio/video production.

In an alternative embodiment, the pre-processor may be a separate unit and may be provided with a screen on which the picture stamps and/or text information are displayed, and a means such as, for example, a touch screen, to provide a facility for selecting the audio/video material items to be ingested.

In a further embodiment of the invention, the ingestion processor 178 generates metadata items such as UMIDs whilst the audio/video material is being ingested. This may required because the acquisition unit in the camera 152 is not arranged to generate UMIDs, but does generate a Unique Material Reference Number (MURN). The MURN is generated for each material item, such as a take. The MURN is arranged to be considerably shorter than a UMID and can therefore be accommodated within the linear time code of a video tape, which is more difficult for UMIDs because these are larger. Alternatively the MURN may be written into a TELEFILE (RTM) label of the tape. The MURN provides a unique identification of the audio/video material items present on the tape. The MURNs may be communicated separately to the database 176 as indicated by the line 174.

At the ingestion processor 178, the MURN for the material items are recovered from the tape or the TELEFILE label. For each MURN, the ingestion processor 178 operates to generate a UMID corresponding to the MURN. The UMIDs are then communicated with the MURN to the database 176, and are ingested into the database in association with the MURNs, which may be already present within the database 176.

Figure 29:
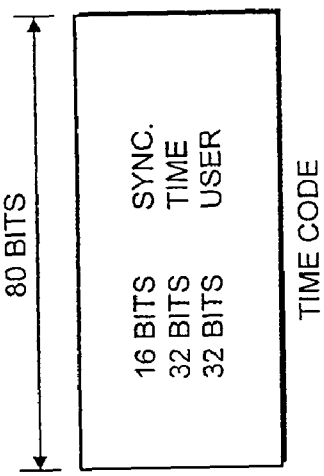
FIGS. 28 to 30 illustrate Tape IDs in linear time code.
Figure 28:
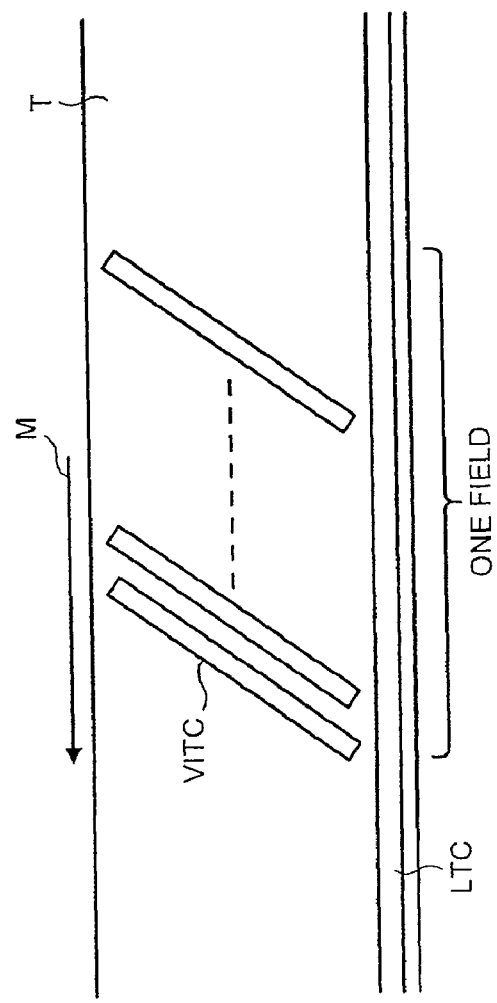
Figure 30:
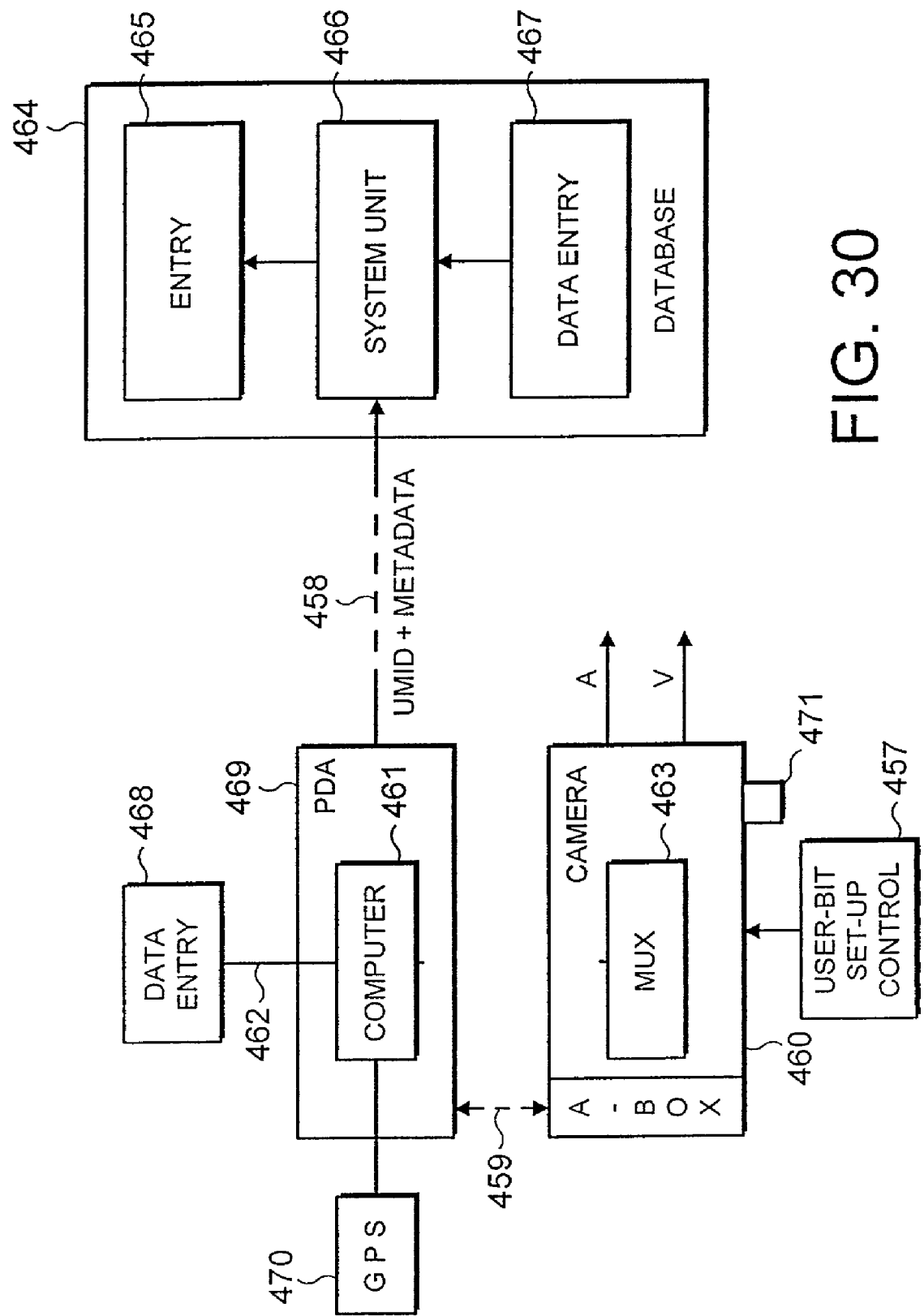

Tape IDs in time code—FIGS. 28 to 30

Referring to FIG. 28, a tape format is shown schematically. Video and audio information is recorded in helical tracks of which a set of, e.g. 10 or 12, tracks records one field of video. The helical tracks include vertical interval time codes (VITC). The time codes may be duplicated in a linear time code track LTC, but the contents of the VITC and LTC may be different. The tape may comprise at least one other linear track (not shown). In this illustrative description it is assumed that all video, audio and other information is recorded digitally. However, the video and audio may be recorded as analogue information. The video and audio information may be compressed according to the MPEG 2 standard for example.

The time codes are recorded once per video field. As schematically shown in FIG. 29, a known time code has 80 bits of which 16 are reserved for synchronisation information, 32 for time code bits and 32 for user defined bits, herein referred to as "user bits". The user bits are interleaved with the other bits in a typical time code; however the invention is not limited to that.

Tape IDs and UMIDs

UMIDs are described in the section UMIDs. They are material identifiers which are universally unique. In embodiments of the present invention they are used to bind material i.e. video and/or audio recorded on the tape to metadata which is stored in for example a database 464 as shown in 30.

Embodiments of the present invention record, on the tape, Tape Identifiers (Tape IDs) having most preferably 64 bits. Tape IDs may have other numbers of bits for example in the range 32 to 64 bits. Unlike a UMID which is universally unique, a Tape ID may not be universally unique but is unique to at least an organisation such as a production company. The Tape ID is recorded in the user bits of the linear time code. If it has 64 bits it occupies two time codes. It thus refers to one frame of two video fields. In preferred embodiments the same tape ID is repeated every frame. Preferably, the tape is "pre-striped" before use to record linear time codes for the fields.

The format of an illustrative Tape ID is any 4 byte hex number as set by the user-bit set-up controls on the VTR or camcorder.

Linking to a UMID

The Tape ID may not be unique. In embodiments of the present invention, a Tape ID is linked to a UMID which uniquely identifies the material recorded on the tape. The UMID is used to link the material on the tape to other metadata relating to the material. If only one piece of material is recorded on a tape, then only the Tape ID needs to be linked to the UMID which uniquely identifies that one piece of material. However, in practice two or more pieces of material would be recorded. For example, the tape may contain two or more takes of the same shot: each take is one piece of material and has its own UMID. Thus to link each UMID to each piece of material, the Tape ID plus the IN (start) and OUT (end) time codes of the piece of material are used.

Linking to a database

It is desirable to provide more detailed metadata relating to the material recorded on the tape. Examples of such metadata are described in the section Camera Metadata. Thus metadata is stored in a database, the UMID linking the metadata to the material.

Illustrative System

Referring to FIG. 30, a digital video source, e.g. a camcorder 460 has a multiplexer 463 which in known manner inserts the Tape ID and the IN and OUT time codes onto a tape. The IN and OUT time codes are generated each time a record start and stop button 471 is operated. The tape ID is generated as follows:

The camcorder records a contiguous set of time codes for all fields; the tape ID is fixed, recorded in the time code user bits and is preset by the user bit controls. The camera also outputs audio A, video V on respective outputs.

The camera has a signal processor termed herein the A-BOX which: stores time code snap shots at the beginning and end of a recording, i.e. the IN and OUT points. The user bits form part of the time code and thus the tape ID is monitored by monitoring the user bits, whereby the tape Idsare stored with the IN and Out points. The A-box derives the user bits of the time codes from the tape and transfers them to a data processor which in this example is a PDA (Personal Digital Assistant) 469. The A-Box is described in more detail in the section A-BOX. It may derive other metadata from the camera and/or material recorded on the tape and transfer it to the PDA 469.

The PDA 469 links the Tape ID and the IN and OUT time codes of the pieces of material recorded on the tape to one or more UMIDs. The PDA has a data entry device 468, for example a keyboard, to enter data and may have, or be connected to, a GPS device 470 for producing the spatial co-ordinate data of an extended UMID. The PDA generates the UMID and associates it with the Tape ID and the IN and OUT codes. The PDA 469 transfers the UMIDs, Tape IDs, IN and Out points, and any other metadata generated at the camera and/or PDA, to a database 464.

The database 464 in this example comprises a data base program run on a standard personal computer (PC) or a laptop computer having a keyboard 467 for data entry, a display 465 and a systems unit 466.

The database 464 stores more extensive and detailed metadata, including the UMID(s), the tape IDs, the IN and OUT points and other metadata generated at the Camera 460, the PDA 469 and/or the data entry device 467. The Tape IDs and the IN and OUT points on the tape and the UMID(s) in the database allow clear and unique linking of the material on the tape, and of the tape on which the material is recorded, to the data in the database.

Metadata, which is additional to the UMID, may be entered into the PDA 469 by the operator using the keyboard 468. A computer 461 in the PDA generates the UMID (whether basic or extended or having the data-reduced structure as shown in FIG. 13 of the section UMIDs) and formats the other metadata into a suitable data structure for transfer to the database 464.

Interconnecting the Camera, PDA and Database.

Data transfer between the A-box and PDA may be by corded or wireless link. For example the PDA may have in Infra Red port for the transfer of data linking with a corresponding Infra-Red port on the A-Box. Likewise the PDA may be linked to the database by a corded or wireless link.

The link from the PDA to the database may be via a telephone link, or by direct radio link. The PDA may be linked to the database via the internet.

Modifications.

The 'A-BOX' and the PDA 469 are shown as items separate from the camera 460. The A-box may be replaced by a processor, e.g. a computer built into the camera. Alternatively both the a-Box and the PDA may be replaced by a processor built into the camera.

Whilst the first aspect of the invention has been described by way of example with reference to tape, the invention may be applied to other recording media. For example tapes may be replaced by discs such as optical or magneto-optical discs or by computer hard discs.

Modifications.

Although the foregoing description describes the embodiments of the first aspect of the invention in relation to video material, the invention may be applied to audio material and/or to data.

Although the foregoing description describes the embodiments of the invention in relation to material recorded on a recording medium, and the MURNs are applied to recorded material, the MURNs may be embedded in material from a live source and transmitted to a processor or to a transmission and distribution network as streamed and unrecorded material.

Second Aspect of the Invention

Figure 31:
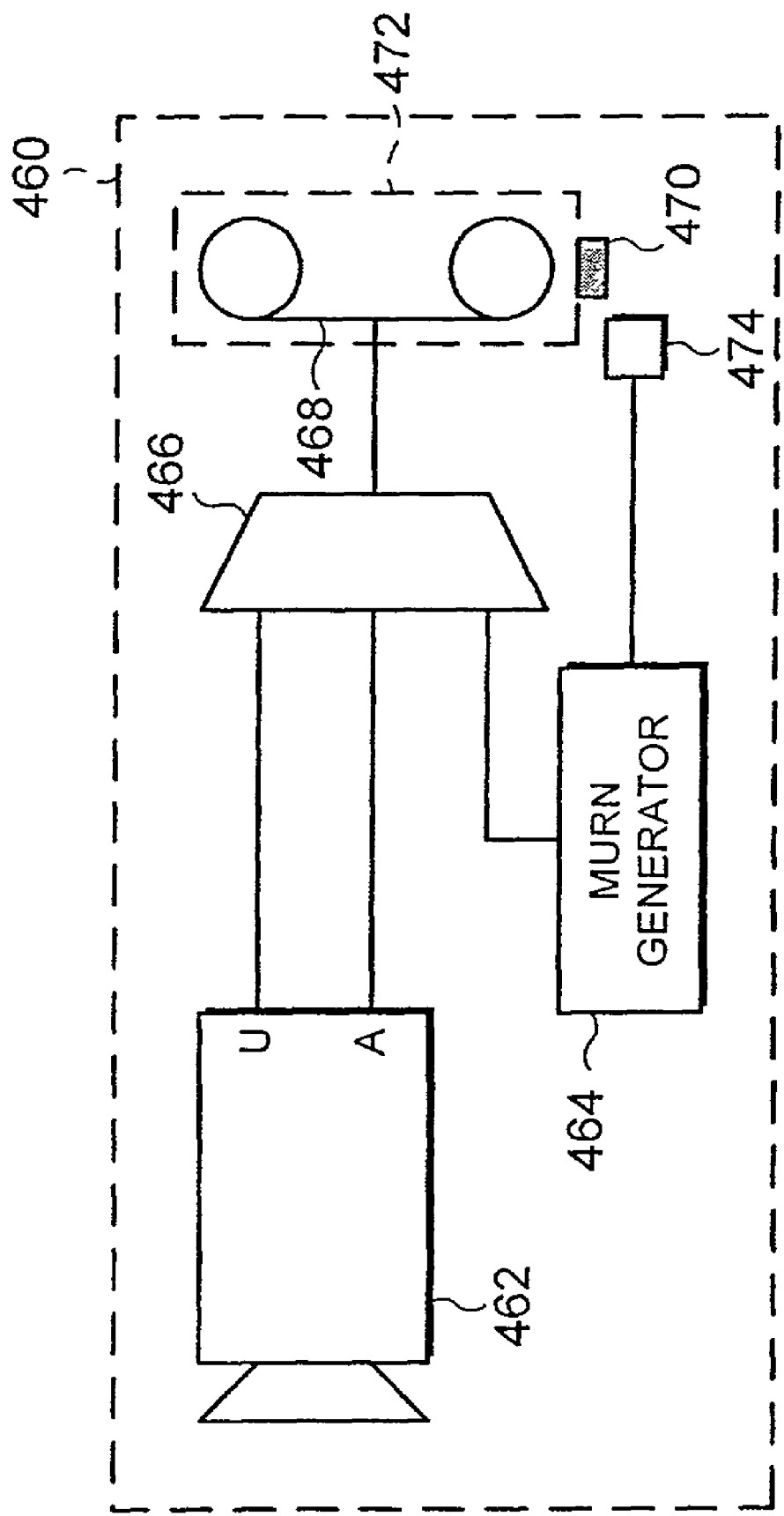
FIG. 31 illustrates an example of the second aspect of the invention.

MURNs in time code—FIGS. 28, 29 and 31

Embodiments of the second aspect of the invention will now be described with reference to:

FIG. 28 which schematically illustrates a known tape format;

FIG. 29 which schematically illustrates a time code; and

FIG. 31 which schematically illustrates a digital camcorder.

Referring to FIG. 28, a tape format is shown schematically. Video and audio information is recorded in helical tracks of which a set of, e.g. 10 or 12, tracks records one field of video. The helical tracks include vertical interval time codes (VITC). The time codes may be duplicated in a linear time code track LTC, but the contents of the VITC and LTC may be different. The tape may comprise at least one other linear track (not shown). In this illustrative description it is assumed that all video, audio and other information is recorded digitally. However, the video and audio may be recorded as analogue information. The video and audio information may be compressed according to the MPEG 2 standard for example.

The time codes are recorded once per video field. As schematically shown in FIG. 29, a known time code has 80 bits of which 16 are reserved for synchronisation information, 32 for time code bits and 32 for user defined bits, herein referred to as "user bits". The user bits are interleaved with the other bits in a typical time code; however the invention is not limited to that.

The present embodiment involves the recording of locally unique material identifiers, to be referred to as MURNs (material unique reference number) in the time code user bits.

Unlike, for example, an SMPTE UMID which is a globally unique reference for a piece of material (but also takes up between 32 and 64 bytes of storage), a MURN can be much shorter—perhaps 16 bits as a typical example. The MURN has only to be unique within an individual tape. Then, in conjunction with a tape identification (perhaps written or printed on the tape, recorded in some form in the TC user bits or stored on a telefile—see below) a piece of recorded material can be identified within an organisation in order to map that material onto a globally unique UMID for later reference.

Therefore, the MURN simply needs to be a number which increments, decrements or otherwise varies from material to material on the tape. As long as the same MURN is not re-used for two pieces of material on the same tape, the local uniqueness requirement is fulfilled.

Referring to FIG. 31, a camcorder 460 comprises a video and audio pickup arrangement 462 (e.g. a CCD image pickup device and a microphone) outputting data audio (A) and video (V) data streams, a MURN generator 464, a multiplexer 466 and a tape recording arrangement 468.

The MURN generator can take many forms, and serves to generate MURNs as described above. Each time the camera starts recording (i.e. at each video in-point) a new MURN is generated by the MURN generator for recording on the TC user bits relating to that piece of material.

The MURN generator operates in conjunction with a "telefile"™ memory 470 associated with the tape medium. The telefile is a non-volatile memory device (e.g. a flash memory device) permanently attachable to the tape case 472 (e.g. a cassette) and which can be remotely interrogated—at least in a non-contact fashion—by a reader/writer 474 for example using magnetic induction for power and data transmission. The telefile stores, amongst other possible date items, a tape identifier and the highest value of MURN (on a 16 bit count) previously used.

So, when a new MURN needs to be generated, the MURN generator interrogates the telefile to find the highest previously used MURN value, increments it and uses that as the new MURN value, writing the new MURN value back to the telefile.

The MURN generated by the MURN generator is passed, with the video and audio data streams and (if used) good shot markers and the like, to the multiplexer 466 for recording on the tape.

The multiplexer arranges the MURN data and the GSM flags (and any other such data) into the time code user bits for both the LTC and the VITC. These user bits are then passed to the tape transport in a conventional way for recording on the tape. Accordingly, embodiments of the invention provide for the material identifying code to be stored effectively twice—in the LTC and in the VITC. This provides for a reliable replay of the material identifying code across a range of replay speeds from jog (single frame movement, where the VITC is more successfully read) to shuttle (where the LTC is more successfully read).

Embodiments of the invention also extend to a tape replay device arranged to recover the MURN data from either or both of the LTC and VITC. Such a device may be substantially as drawn in FIG. 31, but with a demultiplexer performing the above operation in place of the multiplexer 466.

Third Aspect of the Invention

Recording metadata on tape—FIGS. 32 to 41

There are a variety of apparatus in which audio/video information signals are recorded onto a linear recording medium. To illustrate example embodiments of the present invention, a video camera will be used as an example of such an apparatus. However as will be appreciated there are other examples of recording apparatus which could be used and in which information signals are recorded onto a linear recording medium.

Figure 32:
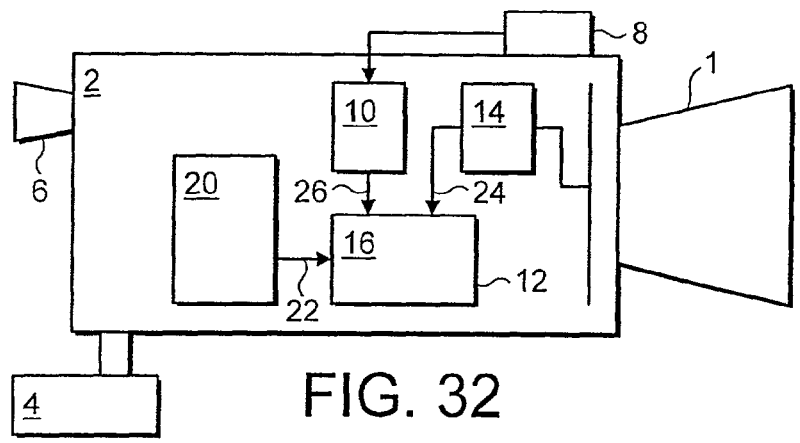
FIG. 32 is a schematic block diagram of a video camera.

An illustration of a video camera is shown in FIG. 32. In FIG. 32 the video camera is shown to comprise a lens arrangement 1 connected to a camera body 2. Also connected to the camera body 2 is a control unit 4 and a view finder 6. Also forming part of the camera is a microphone 8 which is coupled to a sound processor 10. The video camera operates to generate video signals representative of images falling on an image sensor 12. The lens arrangement 1 operates to focus images falling within the field of view of the lens arrangement 1 onto the image sensor 12. The image sensor 12 is connected to a video processor 14. The sound processor 10 and the video processor 14 feed audio and video signals respectively to a recorder 16. The recorder 16 operates to record the audio/video signals onto a magnetic tape which is loaded into the video camera, although this is not shown in FIG. 32. The video camera body 2 is also shown to include a metadata generation processor 20 which is connected to the recorder 16 by a connecting channel 22. The video and audio signals are received by the recorder 16 via two further connecting channels 24, 26. A better understanding of the operation of the recorder 16 which is also arranged to reproduce recorded audio and video signals may be gathered from a more detailed block diagram of the body 2 of the video camera, which shows the recorder 16 and the metadata generation processor 20 where parts also appearing in FIG. 32 bear identical numerical designations.

In FIG. 33 the recorder 16 is shown to include a tape drive 30 having a drive head arrangement 32 which is configured to convert audio and video signals as well as metadata into a form in which they can be recorded onto a magnetic tape 34. Signals representative of metadata are produced by a read/write control processor 36 which is coupled to the drive head 32 via a connecting channel 38. To provide the read/write control processor 36 with a temporal reference, a frame clock 40 is connected to a first input 42 of the control processor 36. The read/write control processor 36 also receives from an external channel 44 signals representative of externally generated metadata. At a third input 48 the read/write control processor 36 receives signals representative of internally generated metadata from the metadata generation processor 20. The control processor 36 is also provided with a data store 50 which is coupled to the control processor 36 via a bi-directional connecting channel 52. The metadata generation processor 20 is shown in FIG. 33 to receive an input from a clock 54 and three further input sensors 56, 58, 60. The clock 54 provides the metadata generation processor with a temporal reference at which the video and audio signals generated by the audio processor and the video processor 10, 14 respectively are produced. The three sensors 56, 58, 60 serve to generate different signals representative of values of parameters of the camera which were use to capture the audio and video signals. For example the sensor 56 could provide signals representative of the "F-stop" or aperture setting of the lens arrangement 1 whereas the second sensor 56 could provide an indication of a frame rate of the video camera. The third sensor 60 could provide an indication of a "good shot marker" which is manually set by the operator of the camera when a good image or shot has been recorded by the camera.

The read/write control processor 36 is arranged in operation to control the tape drive 30 so that the audio and video signals are recorded onto the magnetic tape 34. However according to the example embodiment of the present invention the read/write control processor 36 also operates to record metadata associated with the audio/video signals onto the magnetic tape 34.

In order to better appreciate and understand the example embodiments of the present invention a brief description and explanation will be given of the way in which audio/video signals are recorded onto the magnetic tape 34 along with a time code and an amount of storage capacity allocated to user specified bits. The user specified bits are an example of an information field which is available to the user and which can be used to for example record metadata. To this end FIG. 34 provides an illustration of an arrangement of read/write heads 33 which form part of the drive heads 32 in more detail. In FIG. 34A the drive heads 32 are shown to include a rotating head 70 and a linear head 72. FIG. 34A shows the tape read/write heads 33 as a plan view so that the linear recording head 72 is represented as being below the rotating head 70. As shown in FIG. 34A the magnetic recording tape 34 is wrapped in the shape of the letter omega (Ω) around the rotating head. In this way the magnetic tape is fed past the rotating head 70 and the linear head 72 by the tape drive 30 at a rate which is determined by the band width of the video and audio signals being recorded and properties of the magnetic tape to represent this band width. As already indicated, the rate at which the tape is driven during recording is the recording rate. FIG. 34B shows an elevation view of the read/write heads 33 and as confirmed in this view the linear recording head is disposed underneath the rotating head 70.

The operation of the read/write heads 33 will now be explained with reference to FIG. 35 in which the magnetic tape 34 is shown with areas 76, 78 of the tape shown where information has been recorded. In FIG. 35 the magnetic tape 34 is shown to have recorded on the surface a plurality of helical scan tracks 76 which are disposed at an angle to the linear access at which the magnetic tape is moved past the read/write heads 32. The direction of movement and the linear axis of the magnetic tape are indicated by the arrow 74. In FIG. 35 the helical scan tracks 76 are formed by the rotating head 70 which operates to record the audio and video signals in the helical scan tracks which are arranged at an angle to the linear access of the magnetic tape 34 so that the band width of the video and audio signals can be accommodated within the band width which the properties of the magnetic tape can accommodate. Also shown in FIG. 35 are further areas below the helical scan tracks 76 which are representative of the areas on the magnetic tape where the linear head 72 records the user specified bits (USB) which also include a time code (TC). These linear tracks 78 which are recorded along the linear access of the magnetic tape 34. This is because the band width allocated to the USB and TC information is considerably less than that of the video and audio signals.

As will be appreciated by those skilled in the art, the read/write heads 33 can function both to record the video and audio information signals onto the magnetic tape 34 in the helical scan tracks 76 as well as the USB and TC information in the linear tracks 78 and correspondingly to read or reproduce the information recorded into the magnetic tape 34. When reproducing information recorded onto a magnetic tape it is often necessary to scan or fast forward through the audio and video information in order to navigate through the content of the audio and video information signals. As explained above, this is also know by the term 'shuttle' mode reproduction. In this mode although the rotating head 70 is arranged to rotate at the same speed as that when audio and video information signals were recorded onto the magnetic tape 34 so that the head follows the helical scan tracks at the angle at which the tracks were created with respect to the linear axis of the magnetic tape, during shuttle mode the magnetic tape is driven by the tape drive at a greater speed. As a result the rotating head passes over more than one helical scan track, the number of tracks that the rotating read head passes during any one rotation being determined by the amount by which the rate of feeding the linear tape during the reading rate is greater than the recording rate when the information was recorded. This is illustrated in FIG. 36A.

In FIG. 36A the magnetic tape 34 shown in FIG. 35 is shown to include designated areas shown as bold boxes 80 in FIG. 36A which are representative of the area of the magnetic tape from which information can be recovered by the rotating head 70 at a particular time. In FIG. 36A the arrow 74 which is representative of the rate at which the magnetic tape is fed past the read/write heads 70, 72 is shown to be twice that of the recording rate shown in FIG. 35 which is represented by a reference "×2". As shown in FIG. 36A, a result of the increase in speed of the magnetic tape is that instead of the reproduction area 80 following the linear tracks 76, the reproduction area 80 moves from the bottom of one track to the top of the subsequent track. This is represented by the arrow 82. Correspondingly, a further reproduction area of the linear recording heads 72 is represented as a second bold box 84. Since the rotating head 70 and the linear recording head 72 are stationary and have a fixed relationship with respect to one another, the second reproduction area 84 which is representative of the area on the tape from which the linear read head 72 can recover information moves in correspondence with that of the first reproduction area 80. Therefore correspondingly with the times two (×2) speed up shown in FIG. 36A, the amount of information which can be recovered from the linear tracks 78 is correspondingly reduced because conventionally the information is recovered at normal read speed. As such, although there would be no loss of information from the linear recording track at up to thirty to forty times shuttle speed, conventionally a data processor executing software is provided to read the data recovered from the linear recording track. The data processor would loose information at a rate of twice shuttle speed (×2) because the data processor is arranged to recover data read from the linear recording track at, for example, normal reading rate. As a result information from these areas will be lost. Thus a reduced amount of the USB will be recovered from the magnetic tape 34.

FIGS. 36B and 36C reproduce the representation shown in FIG. 36A except that FIG. 36B shows a times four ×4 speed up and FIG. 36C shows a times eight ×8 speed up. As will be appreciated the amount of information which can be recovered in the times four and times eight speed ups shown by FIGS. 36B and 36C will be proportionally reduced and this is indicated by the reproduction areas 80 shown at three positions as the rotating head moves at the same rate as was used to record the information.

Returning to FIG. 33 the operation of example embodiments of the present invention will now be explained. As will be appreciated from the foregoing discussion during shuttle mode the amount of USB information which may be recovered from the magnetic tape by the recorder 16 will be reduced in proportion to the amount by which the reading rate at which the magnetic tape is being shuttled past the read/write heads which is greater than the recording rate at which the magnetic tape was driven past the read/write heads when the information signals and USB were recorded onto the magnetic tape 34. The read/write control processor 36 is arranged in operation to write the metadata fed from the external connecting channel 46 and the metadata generation processor 20 via the connecting channel 48 onto the magnetic tape in the areas which are designated for the USB information. In general the write control processor 36 operates to write repeatedly metadata onto the magnetic tape 34 in the USB areas 78 the number times the metadata is repeated being determined by the relative importance of the metadata.

As already explained there are various type of metadata which vary in their value and importance. For example a UMID would be of considerably higher value than the aperture setting or 'F-stop' value of the camera when the video signals were generated. Therefore by recording the more important metadata more often onto the magnetic tape than the less important metadata, an inherent increase in a probability of correctly recovering and reproducing the more important metadata will be produced.

According to a first embodiment of the present invention the read/write control processor 36 receives the metadata from the connecting channels 46, 48 and identifies the metadata as being associated with a predetermined different number of metadata types. The type may be for example the UMID, 'F-stop', time or location. This metadata is formed into metadata objects which may consist of a defined number of bytes or a single byte of metadata of the predetermined type. As shown in FIG. 37 according to the first embodiment of the present invention the read/write control processor 36 operates, after identifying the metadata objects, to form the metadata objects into packets. In FIG. 37 boxes 90 represent metadata objects which are different. The metadata objects are fed to a packet forming processor 92 which operates within the read/write control processor 36. The packet forming processor 92 then generates a metadata packet 94 by combining selected ones of the metadata objects and writing the metadata objects 90 into respective fields 96, 98, 100, 102 of the metadata packet 94. The read/write control processor 36 then generates header information which is written to a header 104 of the metadata packet 94.

FIG. 38 provides a representation of an arrangement of metadata objects of the read/write control processor 36 when operating in accordance with the first embodiment of the present invention. The representation shown in FIG. 38 is an illustration of the arrangement in which metadata is repeatedly recorded and does not represent the physical layout of metadata as recorded onto the magnetic tape 34. The representation provided in FIG. 38 is therefore a conceptual form of one example of the first embodiment of the present invention which facilitates understanding. In FIG. 38 a plurality of metadata packets 94 are represented as columns within a matrix in which the rows each represent different fields of the metadata packet. In a preferred embodiment, each of the cells of the matrix represents a byte which is written onto the USB areas of the magnetic tape by the read/write heads 32 under control of the read/write control processor 36. As shown in FIG. 38 the metadata objects which form the second, third and fourth rows of the first four columns have the same values. These values represent, as an illustration, the letters of the word RED, each letter representing a different metadata object so that each letter is repeated four times. This is in accordance with the relative importance of this information. In the next four columns, the first three letters of the word GREEN are repeat recorded in the fields of these four metadata packets. As will be seen however in FIG. 38 the header information has changed from the first four to the subsequent four metadata packets in order to indicate to a reproducing apparatus that the metadata packets have changed. This is because during a shuttle mode in which for example the reading rate is two times that of the recording rate ×2, two out of four metadata packets will be recovered. In this case, in order to provide a reproducing apparatus with a means for distinguishing different metadata packets from each other or to identify the same metadata packets which has been repeat recorded and recovered from the magnetic tape, the header information is provided. Thus as shown in FIG. 38 the header information is arranged to be different between different metadata packets which are successively recorded onto the magnetic tape. For the metadata objects which make up the words RED and GREEN, the headers are the numbers '0' and '1' respectively. As shown in FIG. 38 the third group of four repeated metadata packets 108 has a further different header information and in this case is given the number '2'. The fields of theses metadata packets include the last two letters of the word GREEN. The subsequent fourth group of four metadata packets are shown each to have a different value in the information header which are represented as numbers '0', '1', '2' and '3'. The fourth group of metadata packets 110 represent metadata which is of relatively low importance compared to the words GREEN and RED recorded in the earlier metadata packets. As such in the fourth group of metadata packets, the metadata objects are recorded only once within the fields of the metadata packet. The information represented in the fourth group of metadata packets 110 is the date 01.11.99 and the time 13:28. Again the header information indicates that each of the metadata packets in the fourth group 110 contains different metadata objects. As will be appreciated by comparing the recording arrangement represented by the matrix shown in FIG. 38, a reproducing apparatus will be able to recover the most important metadata represented by the words RED and GREEN provided the rate of reading the magnetic tape during a shuttle mode is not greater than times four.

In order to recover the metadata which has been repeat recorded in accordance with the first embodiment of the present invention, in a preferred embodiment the recorder 16 is arranged in reverse so that the read/write heads operate to read information to detect the metadata packets and to distinguish and determine whether the same metadata packets have been recovered or whether these are different metadata packets. In this case the read/write control processor 36 would act as a read control processor. As will be appreciated the read/write control processor may not be aware of the rate at which the tape drive is driving the magnetic tape across the read/write heads 32. Therefore the control processor 36 operates to detect the header information of the metadata packets which are recovered successively in accordance with the order in which they were recorded. Therefore if in a group the read/write control processor 36 recovers a metadata packet and the next recovered metadata packet has the same header information, then the read/write control processor will discard the metadata packet having the same header information. If however the next metadata packet contains different header information then the read control processor will detect that the subsequently detected metadata packet is a different packet and that the metadata is different and therefore output the previous metadata packet along with the audio/video information signals recovered from the magnetic tape.

A further illustration of the method of recovering metadata, which has been recorded onto the magnetic tape in accordance with the first embodiment of the present invention, is illustrated by a flow diagram shown in FIG. 40. In FIG. 40 the first process step 120 is to recover a metadata packet, with the next process step 122 being to recover the next metadata packet. At process step 124, the process determines whether the header information has changed between the last metadata packet and the previous metadata packet. If the header has not been changed then process step 126 is executed and the packet is discarded and the process continues from 122. If the header information has changed then the process step 128 is executed and the previous metadata packet is output. The process then continues from process step 122.

A second embodiment of the present invention will now be described in which the read/write control processor 36 operates to arrange the metadata and record the metadata repeatedly on the magnetic tape 34 in an arrangement which is represented by a table shown in FIG. 39. The representation shown in FIG. 39 is an illustration of an arrangement in which metadata is repeatedly recorded and does not represent the physical layout of metadata as recorded onto the magnetic tape 34. The representation provided in FIG. 39 is therefore a conceptual representation which facilitates understanding of one example of the second embodiment of the present invention. In accordance with the second embodiment of the present invention the read/write control processor 36 arranges the metadata objects into a plurality of categories. These metadata objects are then repeatedly recorded a number of times in dependence upon the relative importance of each of the categories. In the example embodiment shown in FIG. 39 there are four categories. In the first category represented by the first row of the table, the metadata objects are repeated eight times. Each of the cells of the table again represents an area of the magnetic tape where the USB 78 are recorded. As an example each cell may represent a byte of information. Therefore as shown in FIG. 39 if the word RED is considered to be of the highest importance then each of the letters which represents this example metadata object is repeatedly recorded eight times so that the first eight cells of the first row contain the letter "R". The next row of the table represents the next level of relative importance of the metadata. In this case the metadata objects are repeated four times. Therefore for example if the word GREEN is an example of metadata of this next level of relative importance, then each of the metadata objects which are the letters of the word GREEN are repeated four times therefore the first four cells of the row contain the letter "G" whereas the next four cells of the row contain the letter "R". Similarly the next row of the matrix contains metadata of a correspondingly reduced level of importance. In this example the next level of metadata is represented by the word BLUE and in this row the metadata objects are repeated only twice. Therefore as shown in FIG. 39 the first two cells of this row contain the word "B" the next two cells contain the letter "L" and the next two cells contain the letter "U" and the final two cells contain the letter "E". Finally the final row of the table in FIG. 39 contains the least important metadata which is again represented by the date Jan. 11, 1999 13:28. These metadata objects are repeated only once. In operation the read/write control processor 36 begins writing new objects of metadata with reference to the time code derived from the frame clock 40 which is coupled to the write control processor 36.

A reproducing apparatus which operates to recover the metadata, which has been recorded onto the magnetic tape according to the second embodiment of the second invention, operates as follows. The reproducing apparatus may be the recorder 16 but operated in a reverse mode in that the tape drive is now reading information from the magnetic tape so that the read/write heads are now reversed so that they recover information recorded onto the magnetic tape. The read/write control processor 36 then operates as a read control processor. The control processor recovers each of the metadata objects and from an order or a position at which the metadata objects were recorded onto the magnetic tape 34 in the USB area 78, the read control processor is provided with an association of the recovered metadata objects with the categories in which they were recorded. This is provided with reference to the time code, therefore time code provides an indication of the start of a new metadata group of objects recorded onto the magnetic tape 34. In this example embodiment, the reproducing apparatus will operate to detect a relative rate at which the information signals are being read from the magnetic tape 34 in accordance with a rate at which the magnetic tape 34 is being driven past the read/write heads 32 compared to the reading rate which is the speed at which the tape was driven when the information was being written onto and recorded onto the magnetic tape 34. Therefore by comparing the reading rate to the recording rate, the control processor 36 operates to calculate the number of metadata objects which will be passed before the next metadata object can be recovered from the magnetic tape 34. By dividing this number by the number of times the metadata objects are repeated for each of the categories, the read control processor is able to determine whether the same object has been recovered from the magnetic tape and can therefore discard redundant metadata objects which have been recovered repeatedly. Consider the example shown in FIG. 39. In this case if the read speed is twice that of the recording rate, then of the first row which is repeated eight times, four of the objects will be recovered so that the read processor will have four "R"s. If however the reading rate is four times that of the recording rate, then the control processor will only have two "R"s. If the read rate is eight times the recording rate then only one "R" will be recovered. Similarly for the second row, if the reading rate is twice the recording rate then two "G"s will be recovered from the first four cells of this category. If however the reading rate is four times the recording rate then only one "G" will be recovered. If however the reading rate is times eight then the "G" will not be recovered. Correspondingly it will be appreciated that the number of times the metadata objects are repeated determines the likelihood of whether these objects may be recovered during playback at different shuttle reading rates.

A further understanding of the process of recovering metadata which has been recorded in accordance with the second embodiment of the present invention is provided by a flow diagram which is shown in FIG. 41. In FIG. 41 a first step in the process 130 is to recover the metadata objects from the USB areas 78. Necessarily, contemporaneously the time code is also recovered with the USB information, which is represented as a process step 131. At the next process step 132 the categories to which the metadata objects were assigned when they were recorded are determined. At the next process step 134 a rate at which the reading rate of the metadata is determined with respect to a reading rate which is the rate which the tape is being driven during reading mode. At process step 134 the relative rate of reading is calculated by dividing the reading rate by the recording rate. The next step 136 in the process, the pre-determined number of times the metadata objects were repeatedly recorded for each category is divided by the relative reading rate calculated in step 134. A result of step 136 is to generate a redundancy number which is fed to process step 138. At step 138 all metadata objects after one received following the first time code are discarded to a number equal to the redundancy number.

As will be appreciated the first embodiment of the present invention has an advantage in that the reproduction process for recovering the metadata is more efficient and more simple than the reproduction method required for the metadata recorded in accordance with the second embodiment of the present invention. However this advantage is gained at a disadvantage of requiring a redundant object to be added to the metadata packet which is the header information. In comparison the second embodiment of the present invention does not include any redundant objects although repeat recording in accordance with preferred embodiment is arranged with reference to the time code provided by the frame clock 40.

As will be appreciated by those skilled in the art various modifications may be made to the embodiments herein before described without departing from the scope of the present invention. Furthermore it will be appreciated that the methods as herein before described may be embodied and represented as instructions of a computer program. Furthermore the system and apparatus described herein before may form a suitably programmed data processor operating in accordance with instructions formed from a computer program.

Whilst the embodiments described above each include explicitly recited combinations of features according to different aspects of the present invention, other embodiments are envisaged according to the general teaching of the invention, which include combinations of features as appropriate, other than those explicitly recited in the embodiments described above. Accordingly, it will be appreciated that different combinations of features of the appended independent and dependent claims form further aspects of the invention other than those, which are explicitly recited in the claims.

The invention claimed is:

1. A video and/or audio signal processing system comprising:
   a recorder configured to record video and/or audio material on a recording medium, the recorder including,
      a first generator configured to generate first material identifiers for identifying respective pieces of material on the medium such that each piece is differentiated from other pieces on the medium,
      a second generator configured to generate second identifiers for pieces of material, the second identifiers being generated in accordance with the first material identifiers and a recording medium identifier for identifying the recording medium upon which the material is recorded, and
      a metadata generator configured to generate semantic metadata describing an attribute of the material, the semantic metadata associated with a corresponding first material identifier and the recording medium identifier, the semantic metadata including descriptive information about an actual content of the material, and the metadata generator configured to assign the semantic metadata into different categories and to prioritize recording of each of the different categories such that high priority categories are recorded a greater number of times then low priority categories.

2. A system according to claim 1, wherein a third identifier identifying the machine which initially produces the video and/or audio material is produced and the second generator associates the second identifiers with the recording medium identifier and the first identifiers and the third identifiers in combination.

3. A system according to claim 2, having a data store supported by the housing and additional to the medium; and wherein the third identifier is recorded in the said data store.

4. A system according to claim 2, further comprising a database processor arranged to associate the second identifiers with at least the first identifiers or with the first identifiers and one or more of the medium identifiers and third identifiers.

5. A system according to claim 1, wherein the second identifiers are unique.

6. A system according to claim 5, wherein the second identifiers are universally unique.

7. A system according to claim 6, wherein the second identifiers are UMIDs.

8. A system according to claim 1, wherein the first identifiers are recorded on the medium.

9. A system according to claim 1, wherein the first identifiers comprise material reference numbers.

10. A system according to claim 9, wherein the first identifiers are recorded in user bits of time codes.

11. A system according to claim 1, wherein the recording medium identifier is recorded on the medium.

12. A system according to claim 1, wherein the medium is contained in a housing.

13. A system according to claim 12, having a data store supported by the housing and additional to the medium, and wherein the data store stores at least the medium identifier.

14. A system according to claim 13 wherein at least one first identifier is stored in the data store.

15. A system according to claim 12, wherein the housing has a label on which data may be written.

16. A system according to claim 1, wherein the medium is contained in a housing and, wherein the medium identifier is written on the housing.

17. A video and/or audio signal processing system comprising:
   a recorder configured to record video and/or audio material on a recording medium, the recorder including,
      a first generator configured to generate first material identifiers for identifying respective pieces of material on the medium such that each piece is differentiated from other pieces on the medium,
      a second generator configured to generate second identifiers for pieces of material, the second identifiers being generated in accordance with the first material identifiers and a recording medium identifier for identifying the recording medium upon which the material is recorded, and
      a metadata generator configured to generate semantic metadata describing an attribute of the material, the semantic metadata associated with a corresponding first material identifier and the recording medium identifier, the semantic metadata including descriptive information about an actual content of the material, and the metadata generator configured to generate non-semantic metadata, to estimate an importance of the semantic metadata and the non-semantic metadata, and to prioritize recording of the respective metadata on a basis of the estimated importance such that high importance categories are recorded a greater number of times then low importance categories.

* * * * *